United States Patent
Ujibashi et al.

(10) Patent No.: US 11,797,562 B2
(45) Date of Patent: Oct. 24, 2023

(54) SEARCH CONTROL METHOD AND SEARCH CONTROL APPARATUS

(71) Applicant: FUJITSU LIMITED, Kawasaki (JP)

(72) Inventors: Yoshifumi Ujibashi, Kawasaki (JP); Yui Noma, Kawasaki (JP)

(73) Assignee: FUJITSU LIMITED, Kwasaki (JP)

( * ) Notice: Subject to any disclaimer, the term of this patent is extended or adjusted under 35 U.S.C. 154(b) by 133 days.

(21) Appl. No.: 17/344,371

(22) Filed: Jun. 10, 2021

(65) Prior Publication Data

US 2021/0311961 A1 Oct. 7, 2021

Related U.S. Application Data

(63) Continuation of application No. PCT/JP2019/000659, filed on Jan. 11, 2019.

(51) Int. Cl.
  *G06F 16/00* (2019.01)
  *G06F 16/25* (2019.01)
  (Continued)

(52) U.S. Cl.
  CPC .......... *G06F 16/258* (2019.01); *G06F 16/245* (2019.01); *G06F 16/285* (2019.01)

(58) Field of Classification Search
  None
  See application file for complete search history.

(56) References Cited

U.S. PATENT DOCUMENTS

| 6,542,896 B1 | 4/2003 | Gruenwald |
| 9,442,980 B1 | 9/2016 | Trepetin et al. |

(Continued)

FOREIGN PATENT DOCUMENTS

| JP | H09-044466 A | 2/1997 |
| JP | H10-171643 A | 6/1998 |

(Continued)

OTHER PUBLICATIONS

Yoshifumi Ujibashi et al., "Data Shaping Using Programming by Example with Reduction in the Number of Data Combining Candidates", Proceedings of DEIM Forum 2018, G7-4, Mar. 4-6, 2018, Fukui, Japan (Total 8 pages).

(Continued)

*Primary Examiner* — Anhtai V Tran
(74) *Attorney, Agent, or Firm* — Fujitsu Patent Center

(57) ABSTRACT

A processor obtains an input dataset and an output dataset. The processor begins a search process that is a process of searching for a data conversion path of converting the input dataset via one or more intermediate datasets to the output dataset and that includes generating a plurality of intermediate datasets from the input dataset with different data conversion methods, filtering the plurality of intermediate datasets to select a next search intermediate dataset, and generating another intermediate dataset from the next search intermediate dataset. The processor outputs two or more intermediate datasets generated in the course of the search process and receives selection information indicating a selection of part of the two or more intermediate datasets. The processor controls the filtering method for selecting the next search intermediate dataset on the basis of the selection information.

9 Claims, 20 Drawing Sheets

(51) Int. Cl.
  *G06F 16/245* (2019.01)
  *G06F 16/28* (2019.01)

(56) References Cited

U.S. PATENT DOCUMENTS

| | | | |
|---|---|---|---|
| 9,946,810 | B1 | 4/2018 | Trepetin et al. |
| 10,936,744 | B1 | 3/2021 | Trepetin et al. |
| 2010/0191760 | A1 | 7/2010 | Kusumura et al. |
| 2012/0011084 | A1* | 1/2012 | Gulwani .............. G06F 40/216 706/12 |
| 2013/0262842 | A1 | 10/2013 | Chiba et al. |
| 2014/0081902 | A1* | 3/2014 | Greenwood .......... G06F 16/254 707/602 |
| 2018/0113923 | A1 | 4/2018 | He et al. |

FOREIGN PATENT DOCUMENTS

| | | |
|---|---|---|
| JP | 2013-206290 | 10/2013 |
| JP | 2014-229276 A | 12/2014 |
| JP | 2014-229278 A | 12/2014 |
| WO | 2009017158 A1 | 2/2009 |

OTHER PUBLICATIONS

Akihiro Kishimoto et al., "Scalable, Parallel Best-First Search for Optimal Sequential Planning", Proceedings of 19th International Conference on Automated Planning and Scheduling (ICAPS 2009), Sep. 19-23, 2009, Thessaloniki, Greece (Total 9 pages).

Rishabh Singh et al., "Learning Semantic String Transformations from Examples", Proceedings of the 38th International Conference on Very Large Data Bases, vol. 5, No. 8, pp. 740-751, Aug. 27-31, 2012, Istanbul, Turkey (Total 12 pages).

Zhongjun Jin et al., "Foofah: Transforming Data By Example", Proceedings of SIGMOD' 17, May 14-19, 2017, Chicago, IL, USA (Total 16 pages).

Sumit Gulwani, "Automating String Processing in Spreadsheets Using Input-Output Examples", Proceedings of the 38th annual ACM SIGPLAN-SIGACT symposium on principles of programming languages 2011 (PoPL' 11), Jan. 26-28, 2011, Austin, Texas, USA (Total 13 pages).

*International Search Report* (Form PCT/ISA/210), mailed in connection with PCT/JP2019/000859 and dated Apr. 16, 2019 (Total 1 pages).

Yoshifumi Ujibashi et al., "Data Shaping Using Programming by Example with Reduction in the No. of Data Combining Candidates", Proceedings of DEIM Forum 2018, G7-4, Mar. 4-6, 2018, Fukui, Japan (Total 8 pages).

International Search Report and Written Opinion of the International Searching Authority (Form PCT/ISA/210), mailed in connection with PCT/JP2019/000659 and dated Apr. 16, 2019 (Total 1 pages).

USPTO—Non-Final Office Action dated Nov. 17, 2020 for U.S. Appl. No. 16/268,839 [Patented].

USPTO—Final Office Action dated Apr. 6, 2021 for U.S. Appl. No. 16/268,839 [Patented].

USPTO—Notice of Allowance dated Jul. 20, 2021 for U.S. Appl. No. 16/268,839 [Patented].

\* cited by examiner

PLEASE SELECT ONE THAT IS CONSIDERED THE CLOSEST TO OUTPUT TABLE

○ 75-2

| (China) | apple(China) | 150 |
|---|---|---|
|  | orange Brazil | 300 |

○ 75-3

| apple | China | 100 | 50 |
|---|---|---|---|
| orange | Brazil | 200 | 100 |

○ 75-4

| apple(China) |  | 5000 |
|---|---|---|
| orange Brazil | Brazil | 20000 |

● 75-5

| apple | China | 5000 |
|---|---|---|
| orange | Brazil | 20000 |

---

OUTPUT TABLE 75-1

| Item | Region | Sale |
|---|---|---|
| apple | China | 5400 |
| orange | Brazil | 21600 |

FIG. 10

FUNCTION STORAGE UNIT — 221

FUNCTION TABLE — 231

| FUNCTION ID | DISTANCE FUNCTION | WEIGHT |
|---|---|---|
| 0 | $h_0(n)$ | $\lambda_0$ |
| 1 | $h_1(n)$ | $\lambda_1$ |
| ... | ... | ... |
| N−1 | $h_{N-1}(n)$ | $\lambda_{N-1}$ |

FIG. 12

GRAPH STORAGE UNIT 222

OPEN LIST  232

| NODE ID | TABLE | PARENT NODE | EVALUATION VALUE |
|---|---|---|---|
| 10 | ... | 5 | $f(n_{10})$ |
| 11 | ... | 6 | $f(n_{11})$ |
| ... | ... | ... | ... |

CLOSE LIST  233

| NODE ID | TABLE | PARENT NODE | EVALUATION VALUE |
|---|---|---|---|
| 0 | ... | null | $f(n_0)$ |
| 1 | ... | 0 | $f(n_1)$ |
| ... | ... | ... | ... |

FIG. 13

QUEUE  ╱─ 223

| NODE ID | ESTIMATED DISTANCE |
|---------|--------------------|
| 16 | $h(n_{16})=100$ |
| 15 | $h(n_{15})=100$ |
| 14 | $h(n_{14})=100$ |
| 13 | $h(n_{13})=100$ |
| 12 | $h(n_{12})=100$ |
| 11 | $h(n_{11})=110$ |
| 10 | $h(n_{10})=110$ |

FIG. 14

SEARCH CONTROL METHOD AND SEARCH CONTROL APPARATUS

CROSS-REFERENCE TO RELATED APPLICATION

This application is a continuation application of International Application PCT/JP2019/000659 filed on Jan. 11, 2019 which designated the U.S., the entire contents of which are incorporated herein by reference.

FIELD

The embodiments discussed herein relate to a search control method and a search control apparatus.

BACKGROUND

One of end-user programming techniques for programming without directly writing a program in a programming language is programming-by-example (PBE), which creates a program from "examples." The programming-by-example may be used to create a data conversion program. For example, an input dataset and an output dataset are given as a data conversion example by a user. Then, a search is made to find conversion rules that are able to convert the input dataset to the output dataset, and a conversion program that implements the found conversion rules is created. In this connection, there has been proposed a program synthesizer that synthesizes spreadsheet programs on the basis of an example of execution trajectory.

Please see, for example, Japanese Laid-open Patent Publication No. 10-171643.

A conversion program for converting an input dataset to an output dataset is implemented by combining a plurality of small-unit data conversion methods such as character string division and data item deletion. The combination of data conversion methods may be found by graph search, i.e., by searching for a data conversion path from the input dataset via one or more intermediate datasets to the output dataset.

In this connection, since there are many combination candidates of data conversion methods, a search space is very large and it is therefore inefficient to comprehensively try the large number of candidates. To deal with this, it is considered to perform the search stepwise as follows: different data conversion methods are executed on the input dataset to generate a plurality of intermediate datasets, the plurality of intermediate datasets are evaluated and are then filtered to select a next search intermediate dataset, and the next search intermediate dataset is converted to other intermediate datasets. For example, the plurality of intermediate datasets are filtered to select the next search intermediate dataset using an evaluation function of evaluating whether an intermediate dataset has efficiently approached the output dataset.

However, since the search process involves trying many different combinations of data conversion methods, the filtering method to select the next search intermediate dataset is a key. An inappropriate filtering method may cause many wasteful searches. In view of this, it is not easy to adjust the filtering method so as to efficiently search for a data conversion path with respect to any data conversion example.

SUMMARY

According to one aspect, there is provided a non-transitory computer-readable storage medium storing a computer program that causes a computer to perform a process including: obtaining an input dataset and an output dataset; beginning a search process that includes generating a plurality of first intermediate datasets from the input dataset with different data conversion methods and generating a second intermediate dataset from a first intermediate dataset obtained by filtering the plurality of first intermediate datasets with a filtering method, the search process being a process of searching for a data conversion path of converting the input dataset via part of a set of intermediate datasets including the plurality of first intermediate datasets and the second intermediate dataset to the output dataset; outputting two or more third intermediate datasets included in the set generated in a course of the search process and receiving selection information indicating a third intermediate dataset selected from the two or more third intermediate datasets; and controlling the filtering method, based on the selection information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of an intermediate table selection screen;

FIG. 12 illustrates an example of a function table;

FIG. 13 illustrates an example of an OPEN list and a CLOSE list;

FIG. 14 illustrates an example of a queue;

DESCRIPTION OF EMBODIMENTS

Hereinafter, some embodiments will be described with reference to the accompanying drawings.

First Embodiment

A first embodiment will be described.

Figure 1:
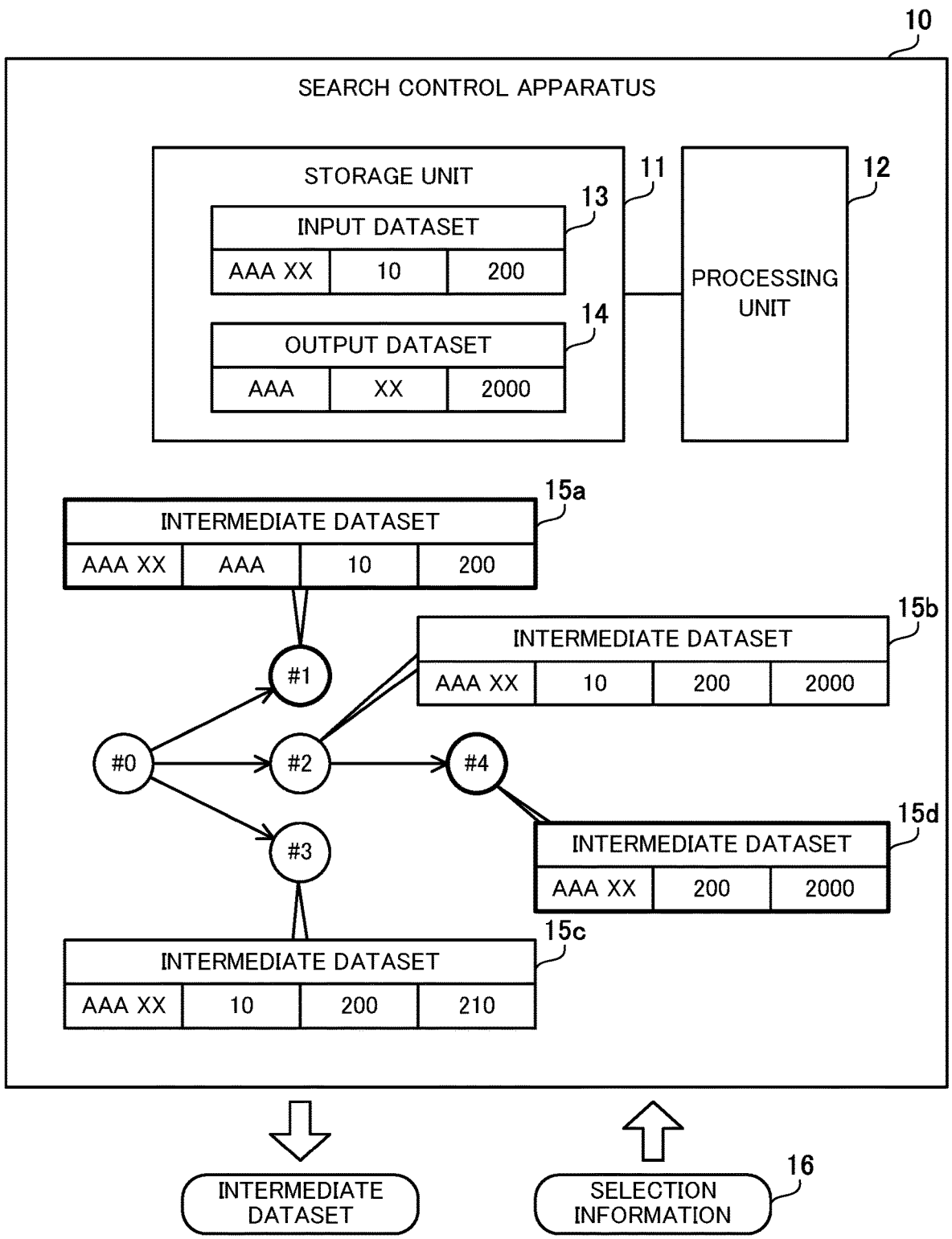
FIG. 1 is a view for explaining an example of a search control apparatus according to a first embodiment.

FIG. 1 is a view for explaining an example of a search control apparatus according to the first embodiment.

The search control apparatus 10 of the first embodiment controls the creation of a data conversion program using programming-by-example. A search process, which will be described below, may be performed by the search control apparatus 10 or another apparatus. The search control apparatus 10 may be called an information processing apparatus or a computer. The search control apparatus 10 may be a client apparatus that is operated by a user or a server apparatus that collaborates with a client apparatus.

The search control apparatus 10 includes a storage unit 11 and a processing unit 12. The storage unit 11 may be a volatile semiconductor memory, such as a random access memory (RAM), or a non volatile storage device, such as a hard disk drive (HDD) or a flash memory. For example, the processing unit 12 is a processor such as a central processing unit (CPU), a graphics processing unit (GPU), or a digital signal processor (DSP). The processing unit 12 may include an application specific integrated circuit (ASIC), a field programmable gate array (FPGA), or another application-specific electronic circuit. A set of multiple processors may be called "a multiprocessor" or simply "a processor."

The storage unit 11 stores therein an input dataset 13 and an output dataset 14. The input dataset 13 and the output dataset 14 are associated with each other to form a data conversion example. The input dataset 13 is a pre-conversion dataset, whereas the output dataset 14 is an ideal converted dataset corresponding to the input dataset 13. The input dataset 13 and output dataset 14 are given from a user, for example.

The processing unit 12 begins to execute a search process using the input dataset 13 and output dataset 14. The processing unit 12 itself may perform the search process or may cause another apparatus to perform the search process. The search process is to search for a data conversion path of converting the input dataset 13 via one or more intermediate datasets to the output dataset 14. The data conversion path is specified as a combination of two or more data conversion methods out of a plurality of data conversion methods prepared in advance that include character string division, four basic arithmetic operations, item deletion, and others. Then, a data conversion program is created, which implements the data conversion path found by the search process.

The search process uses a search algorithm, such as A* (A-star) algorithm, to generate intermediate datasets stepwise. More specifically, the search process includes generating a plurality of intermediate datasets from the input dataset 13 with different data conversion methods, filtering the plurality of intermediate datasets to select a next search intermediate dataset, and generating other intermediate datasets from the next search intermediate dataset. That is, the search process repeats a process of generating a plurality of intermediate datasets from a certain conversion source dataset and selecting an intermediate dataset as a next source of conversion. Such a search process may be represented as a graph search. In this case, a directed graph including a start node representing the input dataset 13, an end node representing the output dataset 14, and a plurality of intermediate nodes representing intermediate datasets is formed. Each edge between the nodes represents execution of one data conversion method. The search process is equivalent to a process of searching for a path from the start node via two or more edges to the end node.

As an example, intermediate datasets 15a, 15b, and 15c are generated from the input dataset 13 with different data conversion methods. These intermediate datasets 15a, 15b, and 15c are filtered to select a next search intermediate dataset. In the case where the intermediate dataset 15b is selected, an intermediate dataset 15d is generated from the intermediate dataset 15b with a certain data conversion method. Other intermediate datasets may additionally be generated from the intermediate dataset 15b with other data conversion methods.

Assume now that a data conversion method that converts the input dataset 13 to the intermediate dataset 15a includes dividing the character string in the first column of the input dataset 13 by a blank and adding the first-half partial character string as another column. A data conversion method that converts the input dataset 13 to the intermediate dataset 15b includes multiplying the numerical values in the second and third columns of the input dataset 13 together and adding the multiplication result as another column. A data conversion method that converts the input dataset 13 to the intermediate dataset 15c includes adding the numerical values in the second and third columns of the input dataset 13 and adding the addition result as another column. A data conversion method that converts the intermediate dataset 15b to the intermediate dataset 15d includes deleting the second column of the intermediate dataset 15b corresponding to the second column of the input dataset 13. Such a search process is performed until a converted dataset that matches the output dataset 14 is obtained.

In the course of the search process, the processing unit 12 extracts two or more intermediate datasets from intermediate datasets generated so far, and outputs the two or more extracted intermediate datasets. Then, the processing unit 12 receives selection information 16 indicating a selection of part (for example, any one intermediate dataset) of the two or more output intermediate datasets. For example, the processing unit 12 displays the two or more extracted intermediate datasets on a display device, causes a user to select part of the intermediate datasets, and receives selection information 16 indicating the user-selected intermediate dataset(s). For example, each selected intermediate dataset is the one that the user considers to be close to the output dataset 14 from among the displayed intermediate datasets.

It is preferable that the intermediate datasets output are end intermediate datasets that are not yet used as sources of conversion, among intermediate datasets generated in the source of the search process. It is also preferable that the intermediate datasets output include a variety of intermediate datasets that are not similar to each other. For example, the processing unit 12 classifies the end intermediate datasets into a plurality of clusters under a prescribed condition such as the degree of similarity of datasets or commonality of conversion paths from the input dataset 13. The processing unit 12 then extracts at least one intermediate dataset from each cluster to determine which intermediate datasets to output.

In addition, timing to output the two or more intermediate datasets is preferably when the search process is stagnant. For example, the processing unit 12 determines to output the intermediate datasets when the quantity of generated intermediate datasets or the number of executions of data conversion methods exceeds a threshold but the output dataset 14 is not yet reached. Alternatively, for example, the processing unit 12 determines to output the intermediate datasets when the degree of similarity between a most recently generated intermediate dataset and the output dataset 14 does not increase. As an example, the processing unit 12 determines to output the intermediate datasets 15a and 15d.

When receiving the selection information 16, the processing unit 12 controls the filtering method for selecting a next search intermediate dataset on the basis of the selection information 16 in the course of the search process. For example, in the case where a next search intermediate dataset is selected from two or more output intermediate datasets, the processing unit 12 adjusts the filtering method so that the priority of the intermediate dataset selected in the selection information 16 becomes higher and the priorities of the other unselected intermediate datasets become lower. In the case of using an evaluation function for filtering the intermediate datasets to select the next search intermediate dataset, the processing unit 12 may update the evaluation function in the course of the search process. The evaluation function may be a function to evaluate the degree of similarity between an intermediate dataset and the output dataset 14. For example, the processing unit 12 updates parameters included in the evaluation function so that the evaluation of the intermediate dataset selected in the selection information 16 increases and the evaluations of the other unselected intermediate datasets decrease. The parameters included in the evaluation function may be weight values for weighting a plurality of distance functions that evaluate the degree of similarity to the output dataset 14 from different viewpoints.

In this connection, the processing unit 12 is able to keep performing the search process, without interrupting it, during a time period from the output of two or more intermediate datasets to the adjustment of the filtering method for selecting a next search target. That is to say, the adjustment of the filtering method and the search process may be performed asynchronously. Even when the filtering method for selecting a next search target is changed, the search process does not need to be started over again from the beginning, and the new filtering method is applied in the subsequent generation of intermediate datasets.

With the search control apparatus 10 of the first embodiment, a data conversion path of converting the input dataset 13 via one or more intermediate datasets to the output dataset 14 is found using the programming-by-example. Therefore, the user does not need to explicitly write a data conversion program in a programming language, which reduces the load of the data conversion.

In addition, two or more intermediate datasets are output in the course of the search process, and the filtering method for selecting a next search target in the subsequent search is controlled on the basis of the selection information 16 received in response to the output. Therefore, the filtering method for selecting a next search target is dynamically adjusted according to the features of the input dataset 13 and output dataset 14. This results in reducing wasteful generation of intermediate datasets and inefficient search, which streamlines the search process.

In addition, since the user is caused to select a preferable intermediate dataset, the user is able to perform intuitive operations, which reduces the load on the user, as compared with the case of directly changing the parameters included in the filtering method for selecting a next search target. In addition, the load of adjusting the filtering method for selecting a next search target before the search begins is reduced. If the parameters in the filtering method for selecting a next search target are learned without training data, the search process itself may need to be repeated. By contrast, in the first embodiment, the parameters are changed in the course of the search process, which reduces the processing time.

Second Embodiment

A second embodiment will now be described.

Figure 2:
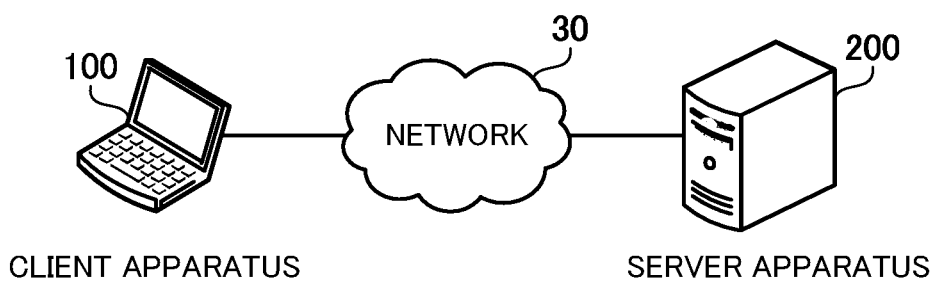
FIG. 2 is a view illustrating an example of an information processing system according to a second embodiment.

FIG. 2 illustrates an example of an information processing system according to the second embodiment.

The information processing system of the second embodiment includes a client apparatus 100 and a server apparatus 200. The client apparatus 100 corresponds to the search control apparatus 10 of the first embodiment. The client apparatus 100 and the server apparatus 200 are able to communicate with each other over a network 30. The network 30 may be a local area network (LAN) or a wide-area network such as the Internet.

The client apparatus 100 is a client computer that is operated by a user. The client apparatus 100 performs data conversion using programming-by-example in collaboration with the server apparatus 200. The client apparatus 100 receives a conversion example associating an input dataset with an output dataset, sends the conversion example to the server apparatus 200, and receives a conversion program created based on the conversion example, from the server apparatus 200. The client apparatus 100 receives another input dataset that is not included in the conversion example, and executes the conversion program on the other input dataset to thereby generate another output dataset corresponding to the other input dataset. In the way described above, it is possible to perform data conversion without programming by the user.

The server apparatus 200 is a server computer that is accessible to the client apparatus 100 and other client apparatuses. The server apparatus 200 automatically creates a conversion program using programming-by-example. The server apparatus 200 receives the conversion example associating the input dataset with the output dataset from the client apparatus 100. The server apparatus 200 searches for generalized conversion rules that are able to convert the input dataset of the conversion example to the output dataset of the conversion example, and creates the conversion program that implements the found conversion rules. The server apparatus 200 sends the created conversion program to the client apparatus 100. In this connection, the client apparatus 100 and the server apparatus 200 are independent apparatuses in the second embodiment, but the client apparatus 100 and the server apparatus 200 may be integrated into a single apparatus so that the single apparatus performs their processes.

Figure 3:
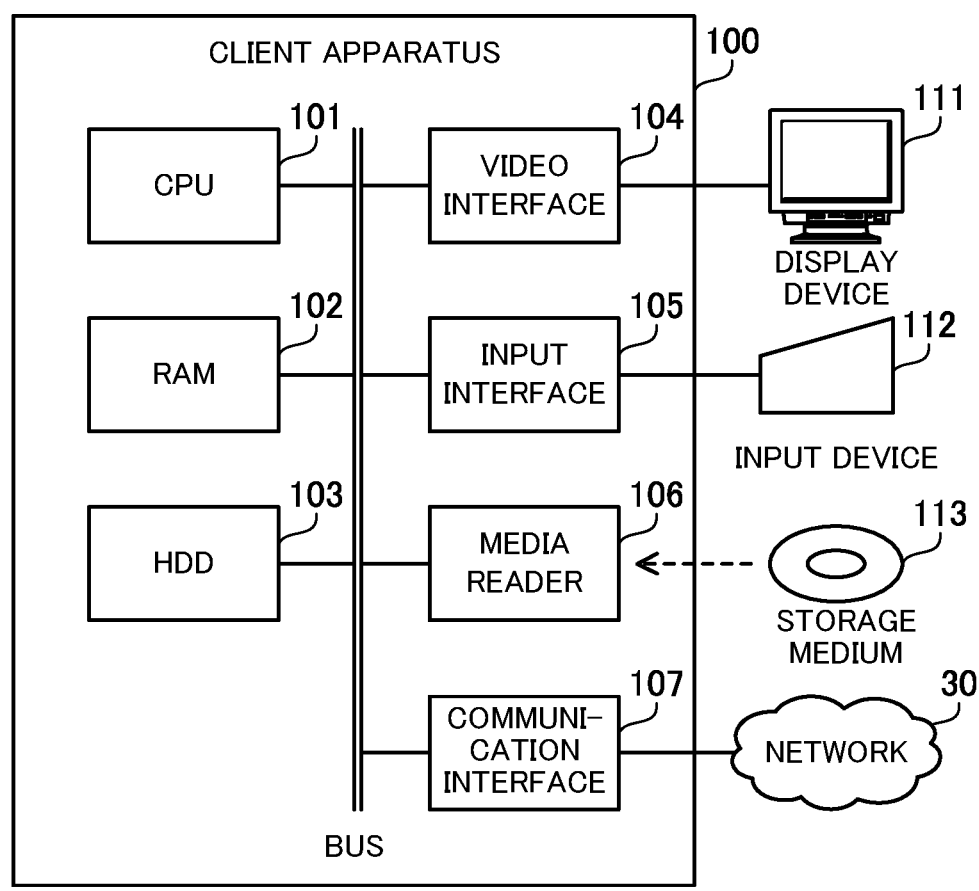
FIG. 3 is a view illustrating an example of a hardware configuration of a client apparatus.

FIG. 3 illustrates an example of a hardware configuration of the client apparatus.

The client apparatus 100 includes a CPU 101, a RAM 102, an HDD 103, a video interface 104, an input interface 105, a media reader 106, and a communication interface 107, which are connected to a bus. The CPU 101 corresponds to the processing unit 12 of the first embodiment. The RAM 102 or HDD 103 corresponds to the storage unit 11 of the first embodiment. The server apparatus 200 has the same hardware configuration as the client apparatus 100.

The CPU 101 is a processor that executes program instructions. The CPU 101 loads at least part of a program or data from the HDD 103 to the RAM 102 and executes the program. The CPU 101 may be provided with a plurality of processor cores, and the client apparatus 100 may be provided with a plurality of processors. A set of multiple processors may be called "a multiprocessor," or simply "a processor."

The RAM 102 is a volatile semiconductor memory that temporarily stores therein a program executed by the CPU 101 and data used by the CPU 101 in processing. The client apparatus 100 may include a different kind of memory than a RAM or a plurality of memories.

The HDD 103 is a non-volatile storage device that stores therein software programs such as an operating system (OS), middleware, and application software, and data. The client apparatus 100 may include a different kind of storage device such as a flash memory or a solid state drive (SSD) or a plurality of storage devices.

The video interface 104 outputs images to a display device 111 connected to the client apparatus 100 in accordance with commands from the CPU 101. Any kind of display device such as a cathode ray tube (CRT) display, a liquid crystal display (LCD), an organic electro-luminescence (OEL) display, or a projector may be used as the display device 111.

The input interface 105 receives an input signal from an input device 112 connected to the client apparatus 100. Any kind of input device such as a mouse, a touch panel, a touchpad, or a keyboard may be used as the input device 112. A plurality of kinds of input devices may be connected to the client apparatus 100.

The media reader 106 is a reading device that reads a program or data from a storage medium 113. For example, a magnetic disk such as a flexible disk (FD) or an HDD, an optical disc such as a compact disc (CD) or a digital versatile disc (DVD), a magneto-optical disk (MO), or a semiconductor memory may be used as the storage medium 113. For example, the media reader 106 stores a program or data read from the storage medium 113 to the RAM 102 or the HDD 103.

The communication interface 107 is connected to the network 30 and communicates with the server apparatus 200 over the network 30. The communication interface 107 may be a wired communication interface connected to a wired communication apparatus such as a switch or a router or may be a wireless communication interface connected to a wireless communication apparatus such as a base station or an access point.

The following describes data conversion using programming-by-example.

Figure 4:
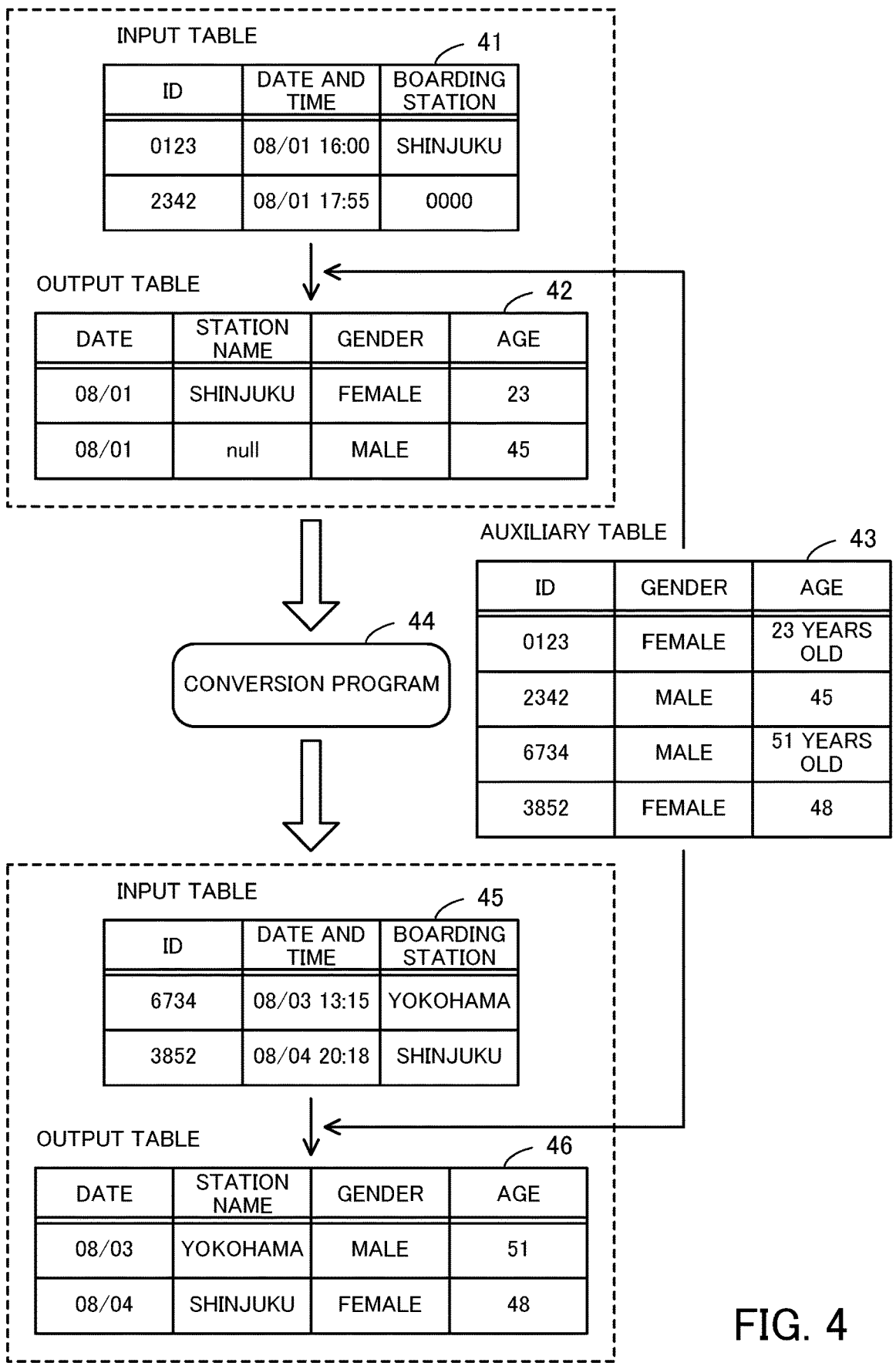
FIG. 4 illustrates an example of executing programming-by-example.

FIG. 4 illustrates an example of executing programming-by-example.

The client apparatus 100 receives a conversion example including an input table 41 and an output table 42 from a user. The input table 41 is an example of input dataset extracted by a user as a sample from a set of datasets to be converted. The output table 42 is an example of output dataset manually generated by the user on the basis of the input table 41 and is an ideal output dataset corresponding to the input table 41. The client apparatus 100 then sends the input table 41 and output table 42 to the server apparatus 200.

The server apparatus 200 creates a conversion program 44 that is able to convert the input table 41 to the output table 42. To convert the input table 41 to the output table 42, the conversion program 44 may refer to external data other than the input table 41, such as an auxiliary table 43. The conversion program 44 only needs to define generalized conversion rules that apply not only to the input table 41 but also to other input tables. The conversion program 44 may include executable instructions or may include the description of conversion rules that are not defined in executable form. The server apparatus 200 sends the conversion program 44 to the client apparatus 100.

The client apparatus 100 receives the conversion program 44 from the server apparatus 200. The client apparatus 100 also receives an input table 45 from the user. The input table 45 is another input dataset different from the input dataset extracted as the input table 41 from the set of datasets to be converted. The client apparatus 100 applies the conversion program 44 to the input table 45 to generate an output table 46. In the case where the conversion program 44 is written in executable form, the client apparatus 100 activates the conversion program 44 and gives the input table 45 as an argument to the conversion program 44. In the case where the conversion program 44 is not written in executable form, the client apparatus 100 interprets the conversion rules defined in the conversion program 44 and converts the input table to the output table 46.

As an example, the input table 41 has the following columns: ID, Date and Time, and Boarding Station. The output table 42 has the following columns: Date, Station Name, Gender, and Age. The auxiliary table 43 has the following columns: ID, Gender, and Age. In the output table 42, a date is part of a character string registered in the Date and Time column of the input table 41, and a station name corresponds to a boarding station registered in the input table 41. In this connection, to represent "no data," the input table 41 uses a value of "0000," whereas the output table 42 uses a value of "null". Gender registered in the output table 42 is gender registered in the auxiliary table 43 in association with the same ID as in the input table 41. Age registered in the output table 42 is age registered in the auxiliary table 43 in association with the same ID as in the input table 41. In addition, the auxiliary table 43 contains additional characters like "years old" following a numerical value representing age, whereas the output table 42 does not contain such additional characters.

The input table 45 is equivalent to the input table 41, and the output table 46 is equivalent to the output table 42. That is, the input table 45 includes the following columns: ID, Date and Time, and Boarding Station. The output table 46 has the following columns: Date, Station Name, Gender, and Age. Date registered in the output table 46 is part of a character string registered in the Date and Time column of the input table 45. Station name registered in the output table 46 corresponds to boarding station registered in the input table 45. In this connection, as to the station name, a character string conversion may be performed as described above. Gender registered in the output table 46 is gender registered in the auxiliary table 43 in association with the same ID as in the input table 45. Age registered in the output table 46 is age registered in the auxiliary table 43 in association with the same ID as in the input table 45. In this connection, as to the age, a character string conversion may be performed as described above.

The above conversion program 44 may be created by combining two or more small-unit data conversion methods such as character string conversion and column division.

Figure 5:
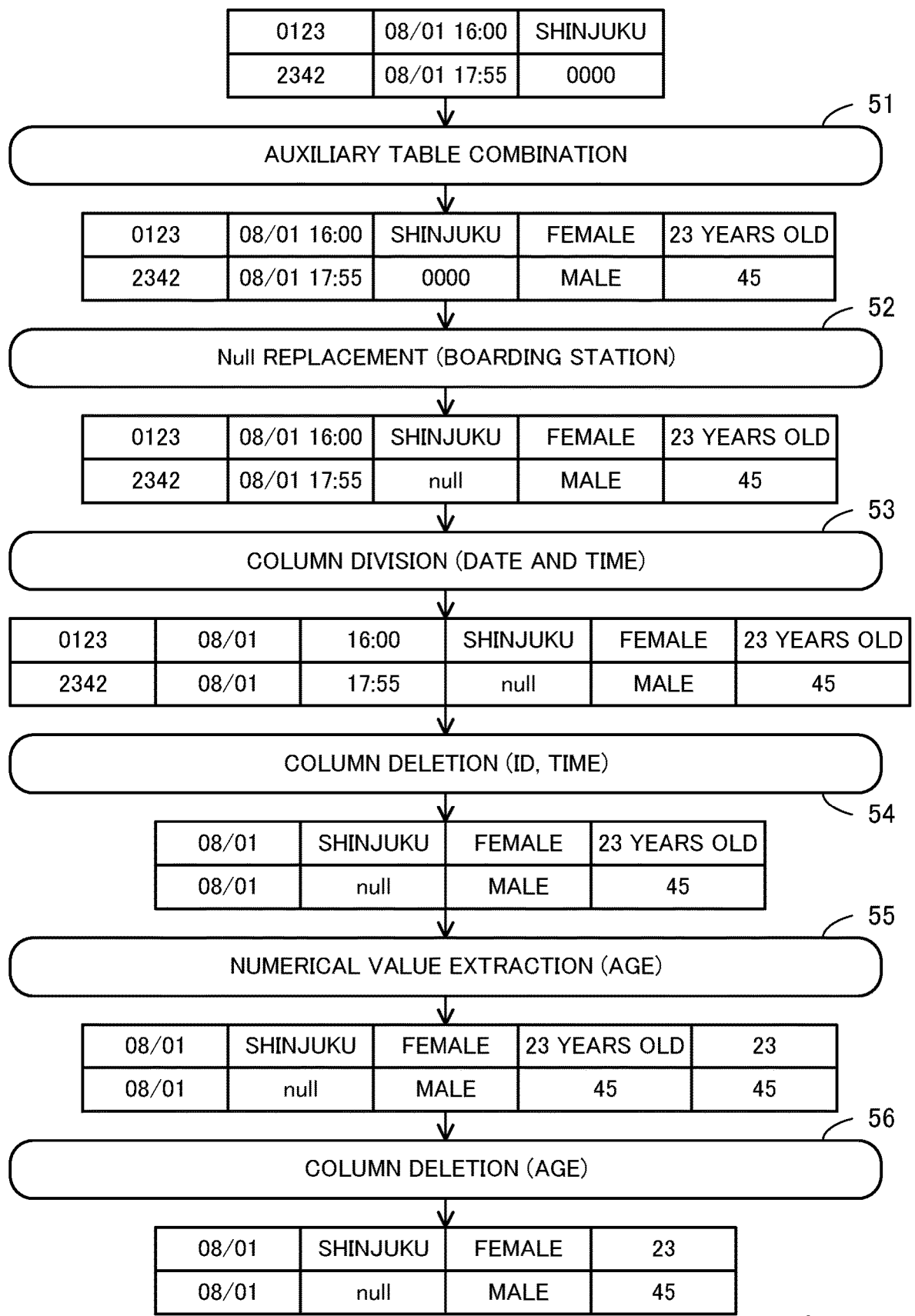
FIG. 5 illustrates a combination example of data conversion methods.

FIG. 5 illustrates a combination example of data conversion methods.

The above conversion program 44 is implemented by combining data conversion methods 51 to 56. The data conversion methods 51 to 56 are executed in this order on the input table 41, thereby generating the output table 42. In addition, the data conversion methods 51 to 56 are executed in this order on the input table 45, thereby generating the output table 46.

The data conversion method 51 is an auxiliary table combination to combine the auxiliary table 43 with a received input table. The data conversion method 52 is a null replacement to replace "0000" contained in the Boarding Station column with "null." The data conversion method 53 is a column division to divide the Date and Time column into a Date column and a Time column. The data conversion method 54 is a column deletion to delete the ID column and the Time column. The data conversion method 55 is a numerical value extraction to extract numerical values from the Age column. The data conversion method 56 is a column deletion to delete the original Age column.

The data conversion method 51 generates an intermediate table with ID, Date and Time, Boarding Station, Gender, and Age columns from the input table with the ID, Date and Time, and Boarding Station columns. Gender and age are found from the auxiliary table 43 on the basis of ID. The data conversion method 52 generates an intermediate table with ID, Date and Time, Station Name, Gender, and Age columns from the intermediate table generated by the data conversion method 51. In the Station Name column, "null" represents "no data."

The data conversion method 53 generates an intermediate table with ID, Date, Time, Station Name, Gender, and Age columns from the intermediate table generated by the data conversion method 52. Date is a portion before the blank in a character string representing date and time. Time is a portion after the blank in the character string representing the date and time. The data conversion method 54 generates an intermediate table with Date, Station Name, Gender, and Age columns from the intermediate table generated by the data conversion method 53.

The data conversion method 55 generates an intermediate table with Date, Station Name, Gender, Age (old column), and Age (new column) columns from the intermediate table generated by the data conversion method 54. Only a numerical value is extracted from the Age (old column) column and is registered in the Age (new column) column. The data conversion method 56 generates an intermediate table with Date, Station Name, Gender, and Age columns from the intermediate table generated by the data conversion method 55. The Age (old column) column used for the numerical value extraction has been deleted.

As described above, by executing the data conversion methods 51 to 56 in order, it is possible to convert the input table 41 to the output table 42. In this connection, there are a plurality of combinations of data conversion methods for realizing the conversion example. For example, the numerical value extraction by the data conversion method 55 may be executed prior to the auxiliary table combination by the data conversion method 51.

When receiving the input table 41 and the output table 42, the server apparatus 200 tries combining two or more data conversion methods out of a plurality of small-unit data conversion methods prepared in advance, in order to search for a combination that is able to convert the input table 41 to the output table 42.

The plurality of data conversion methods are classified into structural conversion, syntax conversion, and semantic conversion. The structural conversion is to convert a table structure, such as column deletion and column movement. The syntax conversion is to convert data representation within a range of data included in conversion target table, such as character string extraction and character string division. The semantic conversion is to interpret the meaning of data included in a conversion target table using information external to the conversion target table, like auxiliary table combination.

There are a variety of data conversion method candidates to apply to one input table and intermediate tables. To select a data conversion method to apply includes selecting one or more columns to be processed from a conversion target table. For example, there are a variety of data conversion method candidates including a method of dividing a character string in one specific column by a space, a method of deleting one specific column, a method of adding numerical values contained in two specific columns, and others.

A search for a combination of data conversion methods that convert the input table 41 to the output table 42 is represented as a graph search that searches for a path from a start node to an end node. A graph includes one start node corresponding to an input table, one end node corresponding to an output table, and many intermediate nodes corresponding to intermediate tables. This graph is a directed graph and includes directed edges corresponding to data conversion methods as edges connecting the nodes. An edge from one node to another node represents a data conversion method of converting a table corresponding to the one node to a table corresponding to the other node.

At the beginning of a graph search, intermediate nodes potentially exist and edges between the nodes are not yet known. When a new intermediate table is generated with a data conversion method, an intermediate node representing the intermediate table comes to exist, and an edge is created from the node corresponding to the pre-conversion table to the existing intermediate node. When a line of edges from the start node to the end node is found, the graph search is completed. The line of the edges from the start node to the end node represents a combination of data conversion methods to be employed.

In view of the execution efficiency of the conversion program 44, it is preferable to detect a shortest path from the start node to the end node. However, in view of the efficiency of the graph search itself, a path other than the shortest path may be detected, as long as the path does not have excessively redundant portions. In the second embodiment, the server apparatus 200 uses the A* algorithm for the graph search.

Figure 6:
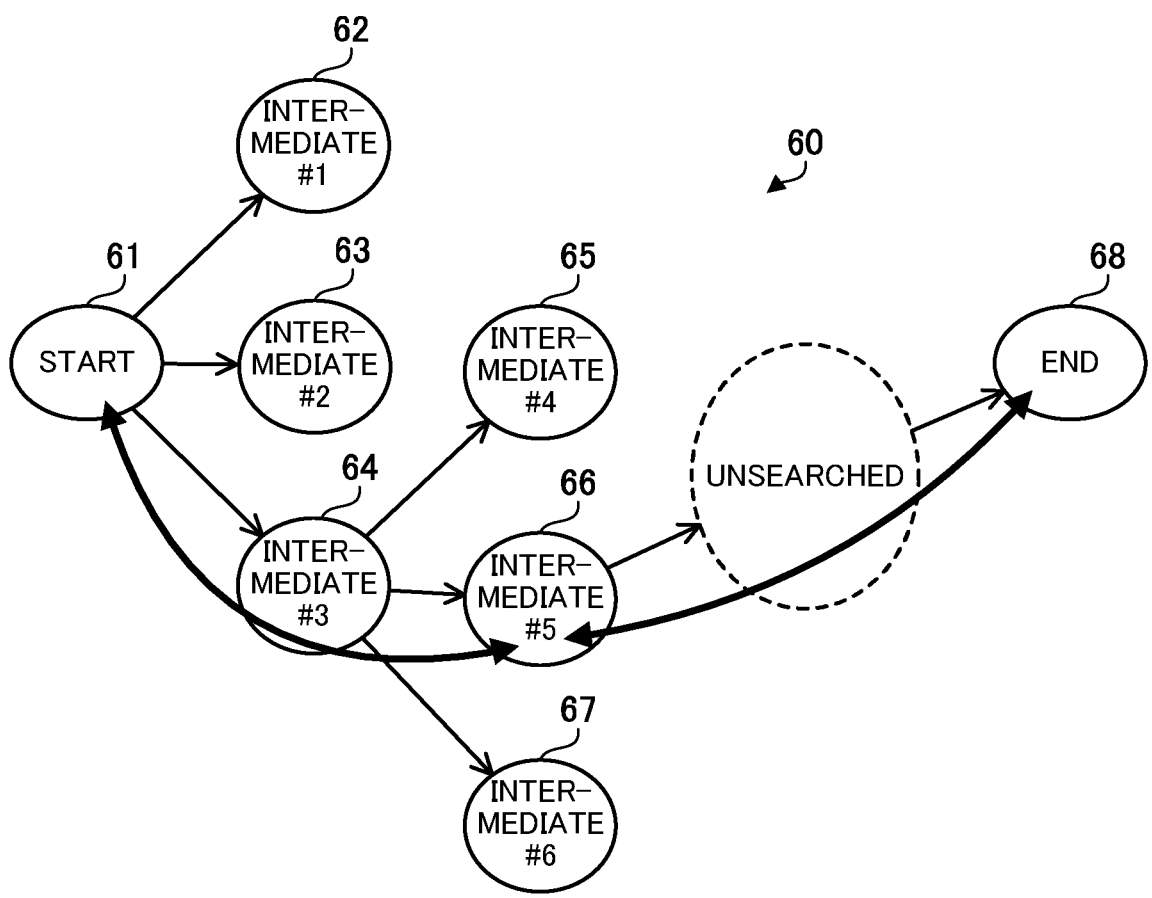
FIG. 6 illustrates an example of a graph search.

FIG. 6 illustrates an example of a graph search.

In the A* algorithm, the server apparatus 200 tries executing a plurality of data conversion methods individually on the input table represented by a start node to thereby generate a plurality of intermediate nodes, which are one hop ahead of the start node. The server apparatus 200 calculates the evaluation value of each of the intermediate nodes with a prescribed evaluation function. This evaluation function is a function that estimates the distance of a path from the start node via the intermediate node to the end node and that evaluates whether the path efficiently approaches the end node. In the calculation of the evaluation value, the intermediate table represented by the intermediate node and the output table represented by the end node are compared with each other. A lower evaluation value indicates a shorter distance and higher evaluation, whereas a higher evaluation value indicates a longer distance and lower evaluation.

The server apparatus 200 selects an intermediate node with the lowest evaluation value from end intermediate nodes (the end intermediate nodes are such that their respective next intermediate nodes one hop ahead are not yet generated). The server apparatus 200 tries executing the plurality of data conversion methods individually on the intermediate table represented by the selected intermediate node to thereby generate a plurality of intermediate nodes that are one hop ahead of the selected intermediate node. The server apparatus 200 calculates the evaluation value of each of the intermediate nodes with the prescribed evaluation function. The server apparatus 200 repeats the above process until the end node is reached, that is, until a converted table matches the output table.

For example, in the graph 60 illustrated in FIG. 6, the server apparatus 200 tries executing three data conversion methods individually on the input table represented by a start node 61 to generate three intermediate tables corresponding to intermediate nodes 62, 63, and 64. By doing so, edges from the start node 61 to the respective intermediate nodes 62, 63, and 64 are generated. The server apparatus 200 compares each of the three intermediate tables represented by the intermediate nodes 62, 63, and 64 with the output table represented by an end node 68 and calculates the evaluation value of each intermediate node 62, 63, and 64.

The server apparatus 200 selects an intermediate node with the lowest evaluation value from the intermediate nodes 62, 63, and 64 that are end intermediate nodes. Assume now that the evaluation value of the intermediate node 64 is the lowest. The server apparatus 200 selects the intermediate node 64 and tries executing the three data conversion methods individually on the intermediate table represented by the intermediate node 64 to thereby generate three intermediate tables corresponding to intermediate nodes 65, 66, and 67. By doing so, edges from the intermediate node 64 to the respective intermediate nodes 65, 66, and 67 are generated. The server apparatus 200 compares each of the three intermediate tables represented by the intermediate nodes 65, 66, and 67 with the output table represented by the end node 68 and calculates the evaluation value of each intermediate node 65, 66, and 67.

The server apparatus 200 selects an intermediate node with the lowest evaluation value from the intermediate nodes 62, 63, 65, 66, and 67 that are end intermediate nodes. Assume now that the evaluation value of the intermediate node 66 is the lowest. The server apparatus 200 selects the intermediate node 66. At the time the intermediate node 66 is selected, intermediate nodes and edges that would exist in a section from the intermediate node 66 to the end node 68 are not yet found. The server apparatus 200 repeats the above process until the end node 68 is reached. When a table generated by trying executing one data conversion method on an intermediate table represented by a certain intermediate node matches the end table, the graph search is completed.

The following describes the evaluation function. According to an evaluation function expressed by an expression (1), the evaluation value f(n) of a node n is the sum of a distance g(n) of the node n and an estimated distance h(n) of the node n. The distance g(n) is the shortest distance from the start node 61 to the node n. The distance g(n) is the sum of the costs of the individual edges from the start node 61 to the node n. The costs may be a fixed value that does not depend on the data conversion methods represented by edges or may be values that depend on the types of the data conversion methods represented by edges. Assuming that the cost is fixed at "1," the distance g(n) is the number of edges (the number of hops) from the start node 61 to the node n.

$$f(n)=g(n)+h(n) \qquad (1)$$

The estimated distance h(n) is an estimated value of the shortest distance from the node n to the end node 68. Since edges from the node n to the end node 68 are not yet known, the estimated distance h(n) is estimated based on the difference between the intermediate table represented by the node n and the output table represented by the end node 68. The estimated distance h(n) represents how close the node n is to the end node 68. A smaller estimated distance h(n) means that the distance from the node n to the end node 68 is estimated to be short, whereas a larger estimated distance h(n) means that the distance from the node n to the end node 68 is estimated to be long. A distance function of calculating the estimated distance h(n) may be called a heuristic function.

For example, with respect to the intermediate node 66, the distance g(n) is the sum of the cost of a transition from the start node 61 to the intermediate node 64 and the cost of a transition from the intermediate node 64 to the intermediate node 66. Assuming that the cost is fixed at "1," the distance g(n) is the number of hops from the start node 61 to the intermediate node 66, and therefore the distance g(n) is calculated to be 2. The estimated distance h(n) is estimated based on the difference between the intermediate table represented by the intermediate node 66 and the output table represented by the end node 68.

In the case where a node m is obtained by applying one data conversion method to the node n, the evaluation value f(m) of the node m is defined by an expression (2). The evaluation value f(m) is the sum of the distance g(n) of the node n, the cost cost(n, m) of the edge between the node n and the node m, and the estimated distance h(m) of the node m. The sum of the distance g(n) and the cost cost(n, m) is equivalent to the distance g(m) of the node m. For example, in the case of a transition from the intermediate node 64 to the intermediate node 66, the evaluation value f(m) of the intermediate node 66 is defined as the sum of the distance g(n) of the intermediate node 64, the cost cost(n, m) of the edge between the intermediate node 64 and the intermediate node 66, and the estimated distance h(m) of the intermediate node 66.

$$f(m)=g(n)+\text{cost}(n,m)+h(m)$$
$$=g(m)+h(m) \qquad (2)$$

As described above, an estimated distance is calculated based on the difference between two tables. However, the difference between two tables encompasses a variety of types of differences including a difference in the number of columns (table structure) between the tables, a difference in character string contained in a specific column, a difference in numerical value contained in a specific column, and a difference in time contained in a specific column. A suitable method of calculating an estimated distance based on a difference depends on the type of the difference. Therefore, it is considered that a distance function suitable for each data type is defined and the weighted sum of a plurality of estimated distances calculated by the plurality of distance functions is defined as the entire estimated distance.

An entire distance function $D(\lambda, n, m)$ is defined as an expression (3). In the expression (3), $d_i(n, m)$ is an i-th (i=0, ..., N−1) distance function among different N distance functions, wherein N is an integer of two or greater. The term n represents the node at one end of a section for which a distance is estimated, and the term m represents the node at the other end of the section for which the distance is estimated. The term $\lambda_i$ is a parameter indicating a weight for an estimated distance calculated by the i-th distance function $d_i(n, m)$. The term $\lambda$ is a weight vector listing N weights $\lambda_i$.

The estimated distance calculated using the distance function $D(\lambda, n, m)$ depends on the node n, node m, and weight vector $\lambda$.

$$D(\lambda, n, m) = \sum_{i=0}^{N-1} \lambda_i d_i(n, m) \qquad (3)$$

where $\lambda = \{\lambda_i \mid 0 \le i < N\}$

The estimated distance h(n) used in the calculation of the evaluation value f(n) of the node n is an estimated distance between the node n and the end node G. Therefore, the entire distance function $H(\lambda, n)$ is defined as an expression (4). The distance function $H(\lambda, n)$ is obtained by setting the node m to the end node G in the distance function $D(\lambda, n, m)$. In the expression (4), the distance function $h_i(n)$ is obtained by setting the node m to the end node G in the distance function $d_i(n, m)$. The estimated distance calculated by the distance function $H(\lambda, n)$ using a specific weight vector $\lambda$ is the estimated distance h(n).

$$H(\lambda, n) = D(\lambda, n, G) \qquad (4)$$
$$= \sum_{i=0}^{N-1} \lambda_i d_i(n, G) = \sum_{i=0}^{N-1} \lambda_i h_i(n) = h(n)$$

The N distance functions $h_i(n)$ may include a distance function of evaluating the edit distance (Levenshtein distance) between two character strings as a difference in character string contained in a specific column. Further, the N distance functions $h_i(n)$ may include a distance function of evaluating the difference or ratio of two numerical values as a difference in numerical value contained in a specific column. Still further, the N distance functions $h_i(n)$ may include a distance function of evaluating the difference between two time points as a difference in time contained in a specific column. Still further, the N distance functions $h_i(n)$ may include a distance function of evaluating the difference in the number of columns between two tables as a difference in table structure.

As an example, the following operation may be performed as a distance function relating to character string. The distance function involves extracting a first column with a data type of character string from the table represented by the node n and extracting a second column that is the most similar in data to the first column as a whole from the output table represented by the end node G. The distance function then calculates an edit distance by comparing the character string of the first column and the character string of the second column with each other with respect to each pair of corresponding records, and calculates the average edit distance of the plurality of records as an estimated distance relating to character string. In addition, the following operation may be performed as a distance function relating to numerical value. The distance function involves extracting a first column with a data type of numerical value from the table represented by the node n and extracting a second column that is the most similar in data to the first column as a whole from the output table represented by the end node G. The distance function then calculates the difference or ratio of the numerical value of the first column and the numerical value of the second column with respect to each pair of corresponding records, and calculates the average difference or ratio of the plurality of records as an estimated distance relating to numerical value.

Using the distance function $H(\lambda, n)$ defined as described above, the estimated distance h(n) is calculated, so that an intermediate node estimated to be closer to the end node 68 is preferentially found as an adjacent intermediate node. As a result, a path that is a short path from the start node 61 to the end node 68 is efficiently found.

However, the efficiency of the graph search depends on the weight vector $\lambda$ that is set in the distance function $H(\lambda, n)$. In the case where the estimated distances h(n) of intermediate nodes have very small variations, a speed of approaching the end node 68 may be slow and many wasteful searches would be made, as in breadth-first search. In the case where the estimated distances h(n) of intermediate nodes have very large variations, however, it would be difficult to correct the course of the search if the search progresses in an inappropriate direction that does not approach the end node 68.

In addition, it is not easy to appropriately adjust the weight vector $\lambda$ so as to streamline the graph search for any input data. In addition, it takes a long search time and is inefficient to learn an appropriate weight vector $\lambda$ by repeatedly trying the graph search. To deal with this, the second embodiment asks for user's decision in the course of the graph search and reflects the user's decision on the distance function $H(\lambda, n)$.

More specifically, the client apparatus 100 receives, from the server apparatus 200, a few intermediate tables generated in the course of the search and presents them to the user to cause the user to select an intermediate table closest to the output table. The client apparatus 100 then adjusts the weight vector $\lambda$ so that the estimated distance h(n) of the intermediate table selected by the user becomes smaller than the estimated distances h(n) of the other unselected intermediate tables. The client apparatus 100 then informs the server apparatus 200 of the weight vector A.

Figure 7:
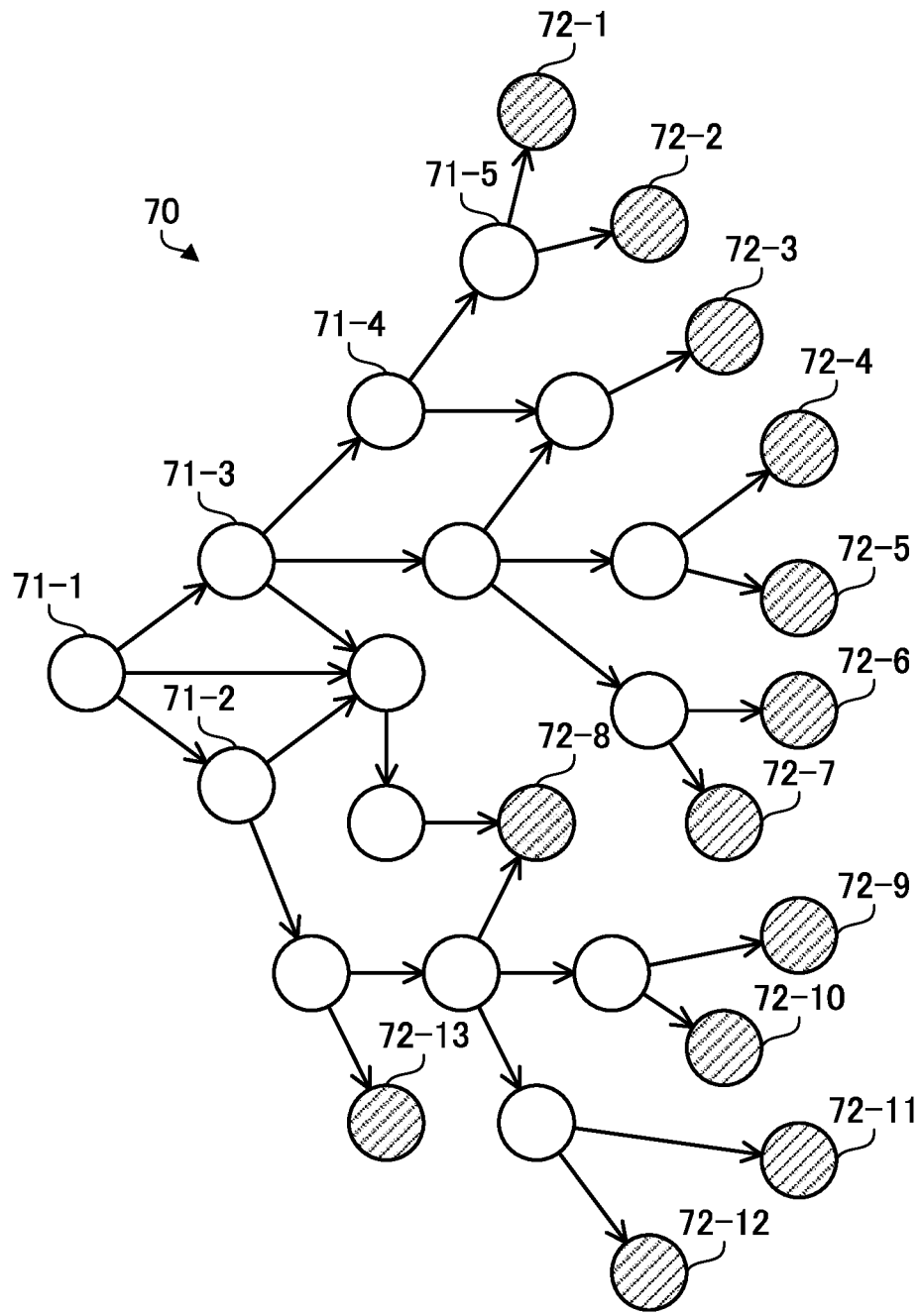
FIG. 7 illustrates an example of a graph in the course of a search.

FIG. 7 illustrates an example of a graph in the course of a search.

For explaining the presentation of intermediate tables to the user, a graph 70 illustrated in FIG. 7 will be considered. The graph 70 is a graph obtained in the course of a search. The graph 70 includes nodes 71-1 to 71-5 and 72-1 to 72-13. The node 71-1 is a start node. The node 71-2 is adjacent to the node 71-1. The node 71-3 is adjacent to the node 71-1. The node 71-4 is adjacent to the node 71-3. The node 71-5 is adjacent to the node 71-4. The nodes 72-1 to 72-13 are end intermediate nodes. The end intermediate nodes are such that their respective next intermediate nodes one hop ahead are not yet found. The end intermediate nodes may be called currently searched nodes or currently examined nodes. Nodes other than the end intermediate nodes may be called already searched nodes or already examined nodes.

Figure 8:
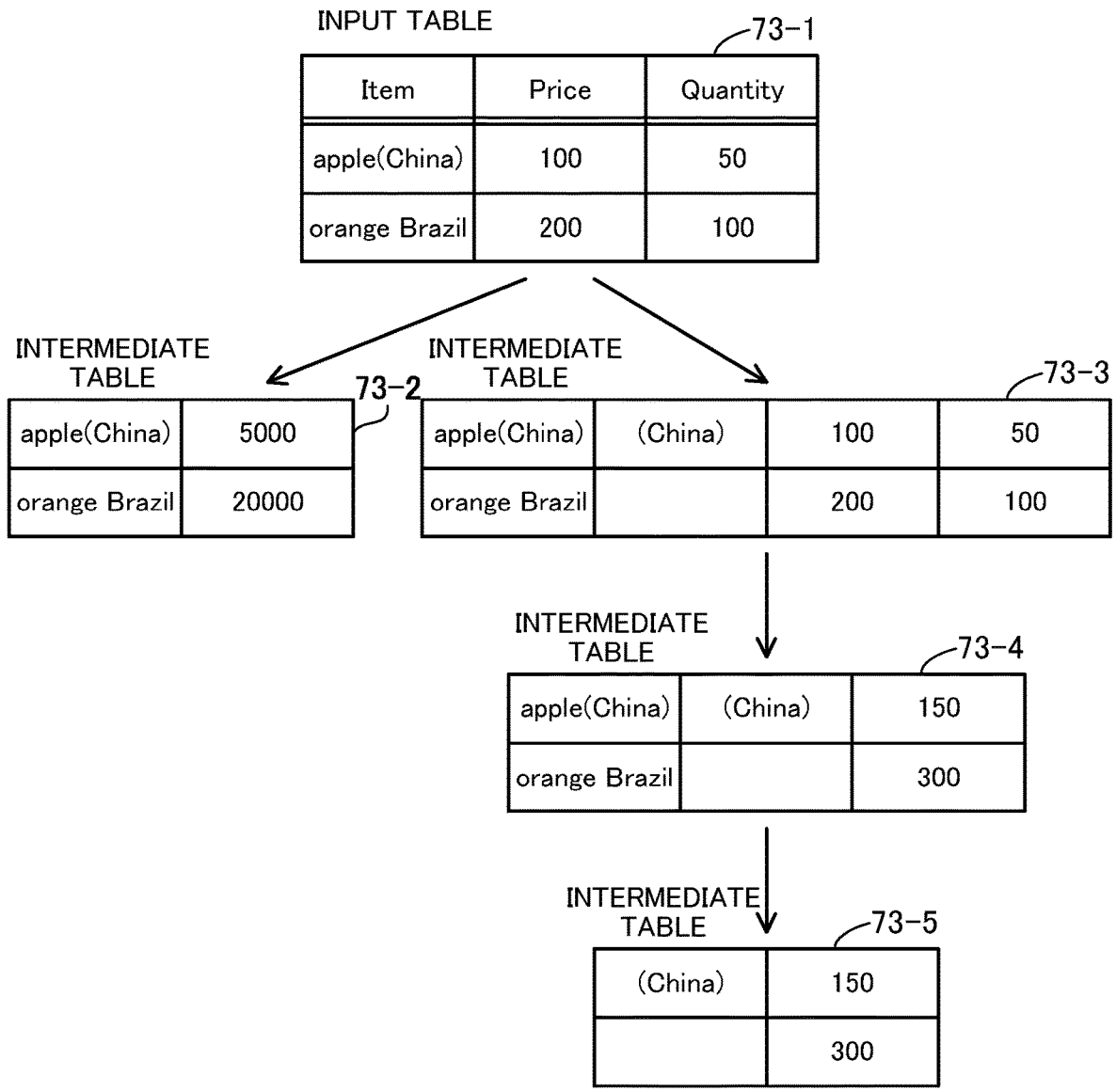
FIG. 8 illustrates an example of tables in the course of the search.

FIG. 8 illustrates an example of tables in the course of the search.

An input table 73-1 corresponds to the node 71-1 that is a start node. The input table 73-1 includes the following columns: Item, Price, and Quantity. The Item column contains a character string indicating a product name and a character string indicating a country of origin, which are connected together. Any delimiter may be used to specify a boundary between the product name and the country of origin. The Price column contains a numerical value indicating the unit price of the product. The Quantity column contains a numerical value indicating the number of products.

An intermediate table 73-2 corresponds to the node 71-2 that is an intermediate node. The intermediate table 73-2 is generated by applying one data conversion method to the input table 73-1 represented by the node 71-1. More specifically, the intermediate table 73-2 is generated by integrating the Price column and Quantity column of the input table 73-1 to generate a column that contains the product of the numerical values contained in these columns. An intermediate table 73-3 corresponds to the node 71-3 that is an intermediate node. The intermediate table 73-3 is generated by applying one data conversion method to the input table 73-1 represented by the node 71-1. More specifically, the intermediate table 73-3 is generated by extracting a character string separated by brackets from the Item column of the input table 73-1.

An intermediate table 73-4 corresponds to the node 71-4 that is an intermediate node. The intermediate table 73-4 is generated by applying one data conversion method to the intermediate table 73-3 represented by the node 71-3. More specifically, the intermediate table 73-4 is generated by integrating the Price column and Quantity column of the intermediate table 73-3 to generate a column that contains the sum of the numerical values contained in these columns. An intermediate table 73-5 corresponds to the node 71-5 that is an intermediate node. The intermediate table 73-5 is generated by applying one data conversion method to the intermediate table 73-4 represented by the node 71-4. More specifically, the intermediate table 73-5 is generated by deleting the original Item column from the intermediate table 73-4.

Figure 9:
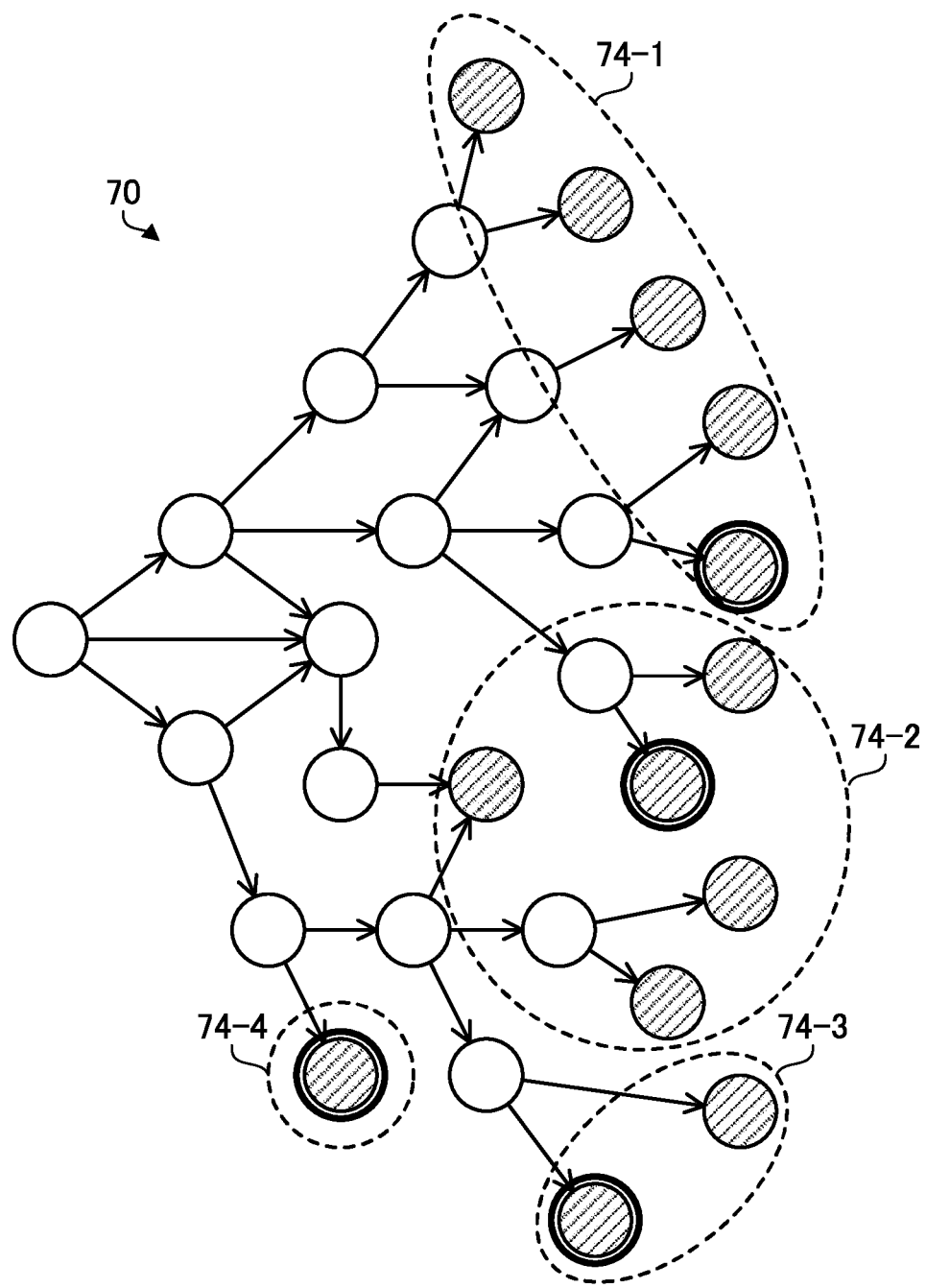
FIG. 9 illustrates an example of selecting nodes in the graph in the course of the search.

FIG. 9 illustrates an example of selecting nodes in the graph in the course of the search.

When a prescribed condition is met in the course of a graph search, the server apparatus 200 selects M intermediate nodes (M is an integer of two or greater) from end intermediate nodes and sends M intermediate tables represented by the M selected intermediate nodes to the client apparatus 100. The number of intermediate nodes selected, i.e., M may be preferably set to ten or less so that the user is able to consider the intermediate tables easily.

The prescribed condition is that the rate of decrease in the estimated distances h(n) of some most-recently searched intermediate nodes is below a threshold. Although the estimated distance h(n) is normally expected to gradually decrease along with the progress of the graph search, convergence of the estimated distance h(n) before the end node is reached means that the graph search is stagnant. In the case where the graph search is stagnant, there is a possibility that the weight vector $\lambda$ for the distance function $H(\lambda, n)$ is inappropriate. In this case, the server apparatus 200 asks for user's decision.

In this connection, any condition other than the detection of stagnation of a graph search, such as a condition that the execution amount of a graph search exceeds a threshold, may be used as the above prescribed condition. For example, a condition that a depth from the start node exceeds a threshold may be used. The depth from the start node is, for example, the maximum value of the number of hops or distance g(n) from the start node to an end intermediate node. Alternatively, a condition that the number of already searched edges exceeds a threshold may be used.

To select the M intermediate nodes, the server apparatus 200 classifies the end intermediate nodes into M clusters. The server apparatus 200 selects one representative intermediate node from each of the M clusters to thereby select the M intermediate nodes.

The M clusters are generated based on the degree of similarity in the estimated distance h(n). Using an clustering algorithm such as the k-means clustering, the server apparatus 200 classifies the intermediate nodes such that intermediate nodes with similar estimated distances h(n) belong to the same cluster. The M clusters do not need to include the same number of intermediate nodes. According to the k-means clustering, the server apparatus 200 randomly assigns the end intermediate nodes to the M clusters first. Then, the server apparatus 200 calculates the average value of the estimated distance h(n) for each cluster. The server apparatus 200 compares the estimated distance h(n) of each intermediate node with the average value of each cluster and moves each intermediate node to a cluster that has an average value closest to the estimated distance h(n) of the intermediate node. The server apparatus 200 repeats this process until the movements of the intermediate nodes are converged. Then, the clustering is completed.

The M clusters may be generated in view of another aspect other than the degree of similarity in the estimated distance h(n). For example, the intermediate nodes may be classified on the basis of a graph structure (topology) such that intermediate nodes located close to each other belong to the same cluster. As an example, the server apparatus 200 traces edges in a reverse direction, starting with the individual end intermediate nodes toward the start node one level by one level. By dividing the graph at a specified level, a plurality of partial trees each including one or more end intermediate nodes are formed. More partial trees are formed by dividing the graph at a level closer to the end intermediate nodes, and fewer partial trees are formed by dividing the graph at a level closer to the start node. The server apparatus 200 forms the M clusters by dividing the graph at a level in which M partial trees are obtained.

A representative intermediate node selected from each of the M clusters is an intermediate node with the smallest estimated distance h(n) in the cluster. In this connection, a representative intermediate node may be selected with another method. For example, the server apparatus 200 may select an intermediate node with the largest estimated distance h(n) from each cluster, or may select an intermediate node with a median estimated distance h(n) in the cluster. Alternatively, the server apparatus 200 may randomly select a representative intermediate node from each cluster.

With respect to the graph 70, the server apparatus 200 classifies the nodes 72-1 to 72-13 into clusters 74-1 to 74-4. The cluster 74-1 includes the nodes 72-1 to 72-5. The cluster 74-2 includes the nodes 72-6 to 72-10. The cluster 74-3 includes the nodes 72-11 and 72-12. The cluster 74-4 includes the node 72-13. The server apparatus 200 selects the node 72-5 from the cluster 74-1, the node 72-7 from the cluster 74-2, the node 72-12 from the cluster 74-3, the node 72-13 from the cluster 74-4. The server apparatus 200 sends four intermediate tables represented by the nodes 72-5, 72-7, 72-12, and 72-13.

FIG. 10 illustrates an example of an intermediate table selection screen.

When receiving M intermediate tables from the server apparatus 200, the client apparatus 100 generates a selection screen 80 including the output table held by the client apparatus 100 and the M intermediate tables and displays the selection screen 80 on the display device 111.

As an example, the selection screen 80 includes an output table 75-1 and intermediate tables 75-2 to 75-5. The intermediate tables 75-2 to 75-5 correspond to the above-described nodes 72-5, 72-7, 72-12, and 72-13. The selection screen 80 includes an input form for selecting one intermediate table from the intermediate tables 75-2 to 75-5. The user compares each intermediate table 75-2 to 75-5 with the output table 75-1 and selects one intermediate table considered the closest to the output table 75-1 from the intermediate tables 75-2 to 75-5. The user uses the input device 112 to enter this selection in the client apparatus 100.

The client apparatus 100 accepts, from the user, the selection operation of one intermediate table from the M intermediate tables. The client apparatus 100 then updates the weight vector λ of the distance function H(λ, n) so as to calculate the estimated distance h(n) appropriate for the user selection. The weight vector λ is adjusted so that a small estimated distance h(n) is calculated for one intermediate table selected by the user from the M intermediate tables presented to the user and large estimated distances h(n) are calculated for the remaining M−1 intermediate tables unselected by the user.

More specifically, the N-dimensional vector λ=($λ_0$, ..., $λ_{N-1}$) is determined so as to satisfy a normalization condition of an expression (5). Assume now that the user selects the intermediate table of a node $n_0$ from the M intermediate tables and does not select the intermediate tables of the other nodes $n_1, ..., n_{M-1}$. A preferable weight vector λ is a vector that satisfies the normalization condition and minimizes the value of the objective function E(λ) defined by an expression (6). The value of the objective function E(λ) is a value obtained by subtracting the average of the estimated distances $h(n_1), ..., h(n_{M-1})$ of the nodes from the estimated distance $h(n_0)$ of the node no. Therefore, to minimize the value of the objective function E(λ) means decreasing the estimated distance $h(n_0)$ of the node $n_0$ and increasing the average of the estimated distances $h(n_1), ..., h(n_{M-1})$ of the nodes $n_1, ..., n_{M-1}$.

$$\sum_{i=0}^{N-1} λ_i^2 = 1 \quad (5)$$

$$E(λ) = H(λ, n_0) - \frac{1}{M-1} \sum_{i=1}^{M-1} H(λ, n_i) \quad (6)$$

The objective function E(λ) is a linear function of the weight vector λ and is therefore deformed into an expression (7). The coefficients $a_0, a_1, ..., a_{N-1}$ in the expression (7) are known coefficients based on N×M estimated distances that are calculated for the M nodes $n_0, ..., n_{M-1}$ using N distance functions $h_0(n), ..., h_{N-1}(n)$. Therefore, the value of the objective function E(λ) is minimized when the weight vector λ is equal to an expression (8). The coefficient vector a in the expression (8) is an N-dimensional vector listing the coefficients $a_0, a_1, ..., a_{N-1}$.

$$E(λ) = \sum_{i=0}^{N-1} a_i λ_i \quad (7)$$

$$λ = -\frac{a}{|a|} \text{ where } a = (a_0, a_1, ..., a_{N-1}) \quad (8)$$

The client apparatus 100 sends, to the server apparatus 200, the weight vector λ calculated as described above. The server apparatus 200 sets the weight vector λ received from the client apparatus 100 in the distance function H(λ, n) and uses the updated distance function H(λ, n) in the subsequent graph search. At this time, the server apparatus 200 does not need to begin the graph search over again from the beginning. This means that the method of calculating the evaluation value f(n) of each node is changed in the course of the graph search. In addition, the server apparatus 200 performs the update of the distance function H(λ, n) and the graph search asynchronously. That is, even while the client apparatus 100 causes the user to select an intermediate table and calculates the weight vector λ, the server apparatus 200 keeps performing the graph search using the pre-update distance function H(λ, n) without interrupting the graph search.

The following describes the functions of the client apparatus and server apparatus.

Figure 11:
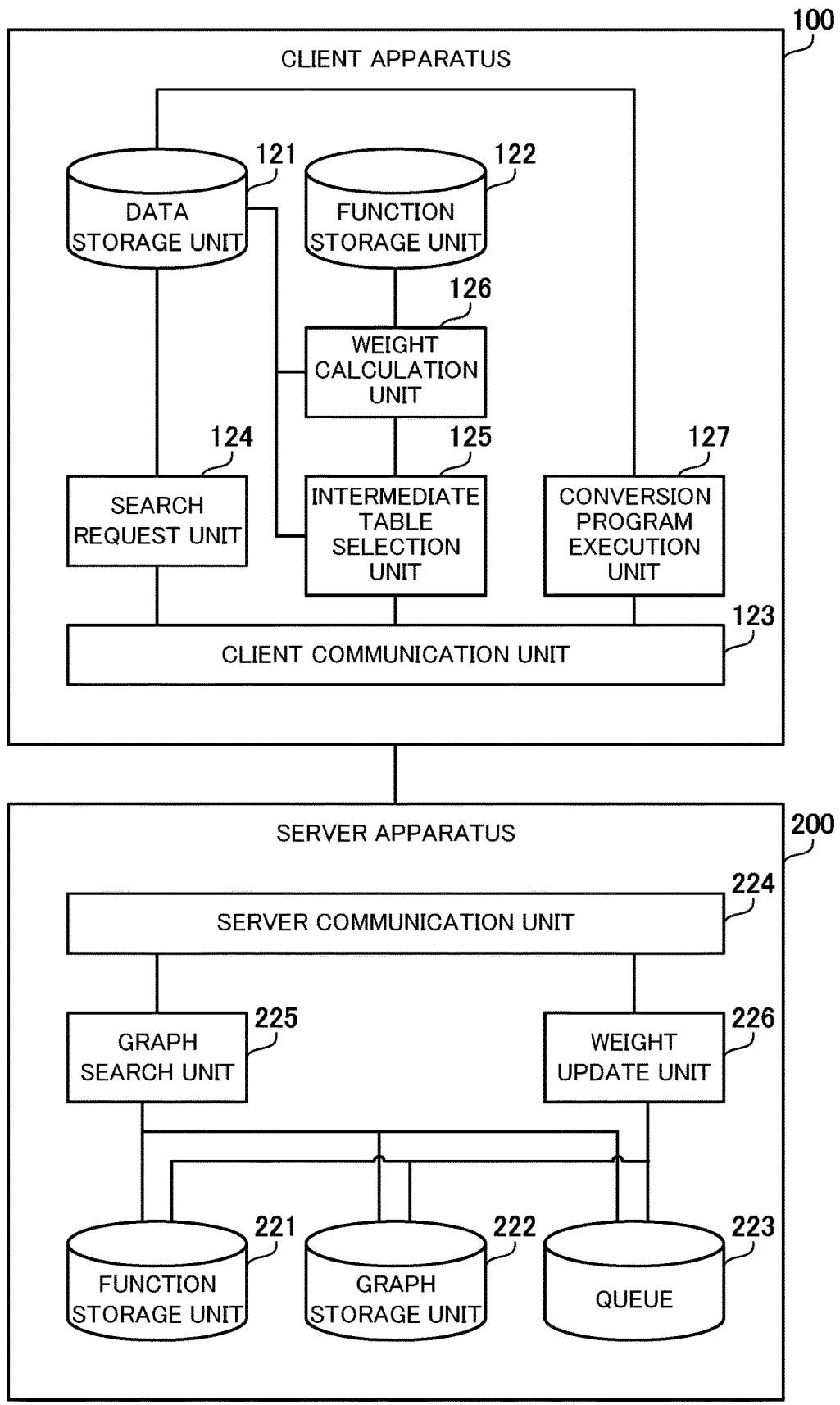
FIG. 11 is a block diagram illustrating an example of functions of the client apparatus and a server apparatus.

FIG. 11 is a block diagram illustrating an example of functions of the client apparatus and server apparatus.

The client apparatus 100 includes a data storage unit 121, a function storage unit 122, a client communication unit 123, a search request unit 124, an intermediate table selection unit 125, a weight calculation unit 126, and a conversion program execution unit 127. The data storage unit 121 and function storage unit 122 are implemented by using a storage space of the RAM 102 or HDD 103, for example. The client communication unit 123 is implemented by using a program executed by the CPU 101 and the communication interface 107, for example. The search request unit 124, intermediate table selection unit 125, weight calculation unit 126, and conversion program execution unit 127 are implemented by a program, for example.

The data storage unit 121 stores therein an input table and an output table given from a user as a conversion example. The data storage unit 121 also stores therein an input table to be converted, which is different from the conversion example. The function storage unit 122 stores N distance functions $h_0(n), ..., h_{N-1}(n)$ that are defined in advance according to data types. Different distance functions are used to evaluate differences between two tables in terms of different data types such as character string, numerical value, and table structure. In this connection, the client apparatus 100 may receive the N distance functions from the server apparatus 200.

The client communication unit 123 performs socket communication with the server apparatus 200.

The search request unit 124 receives, from the user, a data conversion request specifying the conversion example and the input table different from the conversion example. Then, the search request unit 124 causes the client communication unit 123 to generate a socket and establish a connection with the server apparatus 200. Then, the search request unit 124 obtains the input table and output table of the conversion example from the data storage unit 121 and sends them to the server apparatus 200 via the client communication unit 123.

After the search request unit 124 sends the conversion example, the intermediate table selection unit 125 monitors sockets generated by the client communication unit 123. By monitoring the sockets, the intermediate table selection unit 125 may detect the receipt of M intermediate tables from the server apparatus 200. When detecting the receipt of the M intermediate tables, the intermediate table selection unit 125 obtains the output table of the conversion example from the data storage unit 121. The intermediate table selection unit 125 generates a selection screen 80 including the output table and the M intermediate tables and displays it on the display device 111. Then, the intermediate table selection unit 125 receives a selection operation made on the selection screen 80 by the user, and notifies the weight calculation unit 126 of the M intermediate tables and user's selection result (for example, the identification information of an intermediate table selected by the user).

The weight calculation unit 126 receives the M intermediate tables and user's selection result from the intermediate table selection unit 125. Then, the weight calculation unit 126 obtains the N distance functions from the function storage unit 122 and obtains the output table of the conversion example from the data storage unit 121. The weight calculation unit 126 compares each of the M intermediate tables with the output table and calculates M×N estimated distances using the N distance functions. Then, the weight calculation unit 126 calculates the weight vector λ on the basis of the M×N estimated distances and user selection result using the above-described calculation method. The weight calculation unit 126 sends the weight vector to the server apparatus 200 via the client communication unit 123. In this connection, in the second embodiment, the M×N estimated distances are calculated again by the client apparatus 100. However, the M×N estimated distances calculated by the server apparatus 200 may be sent from the server apparatus 200 to the client apparatus 100.

After the search request unit 124 sends the conversion example, the conversion program execution unit 127 receives a conversion program via the client communication unit 123 from the server apparatus 200. Then, the conversion program execution unit 127 causes the client communication unit 123 to close the socket and thereby disconnect the connection with the server apparatus 200. In addition, the conversion program execution unit 127 obtains the input table different from the conversion example from the data storage unit 121, executes the conversion program on the input table different from the conversion example to thereby generate an output table different from the conversion example. Then, the conversion program execution unit 127 displays the output table different from the conversion example on, the display device 111.

The server apparatus 200 includes a function storage unit 221, a graph storage unit 222, a queue 223, a server communication unit 224, a graph search unit 223, and a weight update unit 226. The function storage unit 221 and graph storage unit 222 are implemented by using a storage space of a RAM or HDD provided in the server apparatus 200, for example. The server communication unit 224 is implemented by using a program executed by a CPU provided in the server apparatus 200 and communication interface, for example. The graph search unit 225 and weight update unit 226 are implemented by a it program, example.

The function storage unit 221 stores therein N distance functions $h_0(n), \ldots, h_{N-1}(n)$ that are defined in advance according to data types. The distance functions stored in the function storage unit 221 are the same as those stored in the function storage unit 122 of the client apparatus 100. In addition, the function storage unit 221 stores therein a weight vector λ listing N weights $\lambda_0, \ldots, \lambda_{N-1}$ that are applied to the N distance functions. The weighted sum of the distance functions $h_0(n), \ldots, h_{N-1}(n)$ is the entire distance function M(λ, n). At the beginning of the graph search, the initial value of the weight vector λ is stored in the function storage unit 221. The weight vector λ may be updated by the weight update unit 226.

The graph storage unit 222 stores therein graph information of a graph under search. The graph information includes topology information indicating a connection relationship among nodes. The graph information also includes information for distinguishing end intermediate nodes (currently examined intermediate nodes) and the other intermediate nodes (already examined intermediate nodes). The graph information also includes the evaluation value f(n) of each node.

The queue 223 is a FIFO (first-in first-out) type buffer that is able to store a prescribed number of records at maximum. The queue 223 is implemented by using a ring buffer, for example. The queue 223 stores therein at most a prescribed number of most recently calculated estimated distances h(n). Until the prescribed number of estimated distances is stored after the beginning of the graph search, calculated estimated distances h(n) are sequentially inserted at the end of the queue 223. When the prescribed number of estimated distances is stored, the oldest estimated distance h(n) is deleted from the queue 223 and a new estimated distance h(n) is inserted at the end of the queue 223.

The server communication unit 224 performs socket communication with the client apparatus 100. The server communication unit 224 generates a socket for receiving a connection request from the client apparatus 100 and waits. When receiving the connection request from the client apparatus 100, the server communication unit 224 establishes a connection with the client apparatus 100 and generates a connection socket for the individual communication.

The graph search unit 225 receives the input table and output table of the conversion example from the client apparatus 100 via the server communication unit 224. Then, the graph search unit 225 begins a graph search using the N distance functions and weight vector λ stored in the function storage unit 221 to find a combination of data conversion methods that convert the input table to the output table. In the course of the graph search, the graph search unit 225 occasionally updates the graph information stored in the graph storage unit 222. Each time the graph search unit 225 calculates a new estimated distance h(n), the graph search unit 225 stores the calculated estimated distances h(n) in the queue 223.

In addition, the graph search unit 225 monitors the queue 223 during the graph search to determine whether the graph search is stagnant. In the case where the rate of decrease in most recent estimated distances h(n) is below a threshold, it is determined that the estimated distance h(n) is converged and the graph search is therefore stagnant. In the case where the graph search is stagnant, the graph search unit 225 selects M intermediate nodes from end intermediate nodes (currently examined intermediate nodes) included in the graph. Then, the graph search unit 225 sends the M intermediate tables represented by the selected intermediate nodes to the client apparatus 100 via the server communication unit 224. Even after sending the M intermediate tables, the graph search unit 225 may keep performing the graph search without waiting for a response from the client apparatus 100.

After the graph search unit 225 sends the M intermediate tables, the weight update unit 226 monitors a connection socket generated by the server communication unit 224. By monitoring the connection socket, the weight update unit 226 detects the receipt of a weight vector λ from the client apparatus 100. When detecting the receipt of the weight vector λ, the weight update unit 226 stores the received new weight vector λ in the function storage unit 221. The weight update unit 226 also recalculates the evaluation value f(n) of each intermediate node using the distance function H(λ, n) updated with the new weight vector λ, and updates the graph information stored in the graph storage unit 222. In this connection, even when the evaluation value f(n) is updated, the reworking of the graph search from the start node does not occur.

FIG. 12 illustrates an example of a function table.

The function storage unit 221 in the server apparatus 200 stores therein a function table 231. The function table 231 includes the following items: function ID, distance function, and weight. As the function ID item, identifiers identifying N distance functions are stored. As the distance function item, the contents of the distance functions $h_0(n)$, $h_1(n)$, $h_{N-1}(n)$ are stored. As the weight item, weights $\lambda_0, \lambda_1, \ldots, \lambda_{N-1}$ corresponding to the distance functions $h_0(n)$, $h_1(n), \ldots, h_{N-1}(n)$ are stored. In this connection, the function storage unit 122 of the client apparatus 100 stores therein the same table as the function table 231, but the function storage unit 122 does not need to store weights therein.

FIG. 13 illustrates an example of an OPEN list and a CLOSE list.

The graph storage unit 222 of the server apparatus 200 stores therein an OPEN list 232 and a CLOSE list 233. The OPEN list 232 includes information on end nodes of a graph, i.e., currently examined nodes. The CLOSE list 233 includes information on nodes other than the end nodes of the graph, i.e., already examined nodes. In the course of the graph search, node information may be moved between the OPEN list 232 and the CLOSE list 233.

The OPEN list 232 and CLOSE list 233 each include the following items: node ID, table, parent node, and evaluation value. As the node ID item, an identifier identifying each node is stored. As the table item, the data contents of each table are stored. As the parent node item, the identifier of a node located one before each node (on a side closer to the start node) is stored. As the evaluation value item, the evaluation value f(n) of each node is stored. In this connection, in the second embodiment, the OPEN list 232 and CLOSE list 233 each include the evaluation value f(n) of each node, but may additionally include distance g(n) and estimated distance h(n).

FIG. 14 illustrates an example of a queue.

The queue 223 includes the following items: node ID and estimated distance. As the node ID item, the identifiers of nodes whose estimated distances h(n) are calculated most recently are stored. As the estimated distance item, a prescribed number of most recent estimated distances h(n) is stored. Referring to FIG. 14, seven estimated distances $h(n_{10}), h(n_{11}), \ldots, h(n_{16})$ are stored in the queue 223. In FIG. 14, the top of the queue 223 is illustrated in the lower part and the end of the queue 223 is illustrated in the upper part. A new estimated distance is inserted at the upper side, and the existing estimated distances are shifted downward. When the queue 223 is full, then the oldest estimated distance flows from the lower side and is deleted.

The following describes how the client apparatus 100 and server apparatus 200 operate.

Figure 15:
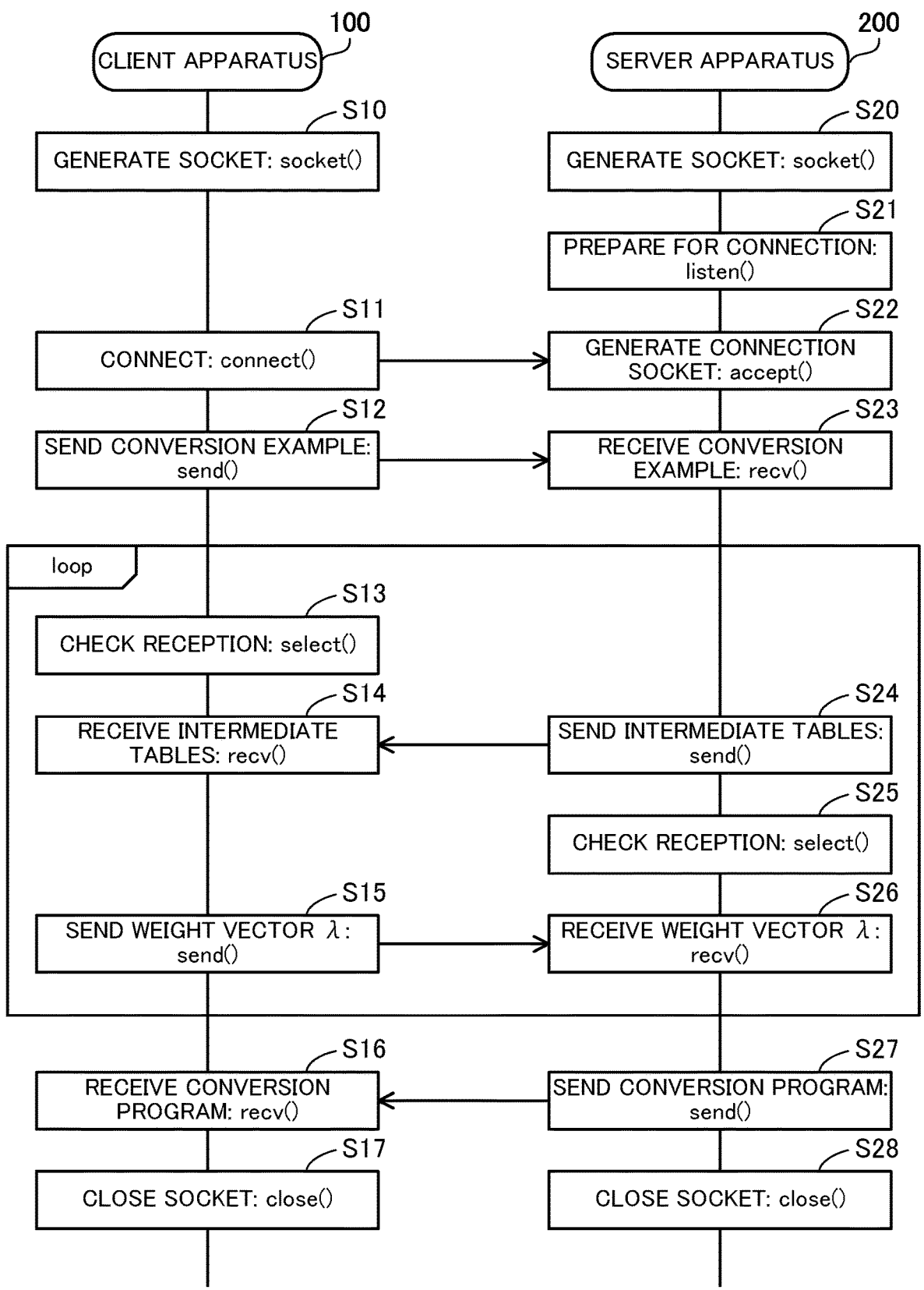
FIG. 15 is a sequence diagram illustrating an example of communication between the client apparatus and the server apparatus.

FIG. 15 is a sequence diagram illustrating an example of communication between the client apparatus and the server apparatus.

The server apparatus 200 issues a system call "socket" and generates a socket to get ready for receiving a connection request (S20). The server apparatus 200 issues a system call "listen" to prepare for connection so as to be able to detect a connection request, and waits (S21).

When receiving a data conversion request from a user, the client apparatus 100 issues a system call "socket" and generates a socket (S10). The client apparatus 100 issues a system call "connect" and connects to the server apparatus 200 using the generated socket (S11). The server apparatus 200 issues a system call "accept," generates a connection socket, and establishes a connection with the client apparatus 100 (S22). The client apparatus 100 issues a system call "send" and sends a conversion example including an input table and an output table to the server apparatus 200 (S12). The server apparatus 200 issues a system call "recv" and receives the conversion example from the client apparatus 100 (S23).

The above communication triggers the server apparatus 200 to begin a graph search. Steps S14, S15, and S24 to S26, which will be described below, are options whose executions are determined depending on the progress state of the graph search. There are times when these steps S14, S15, and S24 to S26 are not executed even once, are executed only once, or are repeatedly executed twice or more.

The client apparatus 100 issues a system call "select" and waits for the arrival of data while periodically checking a socket (S13). In the case of making an attempt to update the weight vector $\lambda$, the server apparatus 200 issues a system call "send" and sends intermediate tables to the client apparatus 100 (S24). After sending the intermediate tables, the server apparatus 200 issues a system call "select" and waits for the arrival of data while periodically checking a connection socket (S25).

When detecting the arrival of data in reception check, the client apparatus 100 issues a system call "recv" and receives the intermediate tables from the server apparatus 200 (S14). When having calculated a weight vector $\lambda$, the client apparatus 100 issues a system call "send" and sends the weight vector $\lambda$ to the server apparatus 200 (S15). When detecting the arrival of data in reception check, the server apparatus 200 issues a system call "recv" and receives the weight vector $\lambda$ from the client apparatus 100 (S26).

When the server apparatus 200 has completed the graph search, the server apparatus 200 issues a system call "send" and sends a conversion program to the client apparatus 100 (S27). The server apparatus 200 then issues a system call "close" and closes the connection socket (S28). The client apparatus 100 issues a system call "recv" and receives the conversion program from the server apparatus 200 (S16). The client apparatus 100 then issues a system call "close" and closes the socket (S17).

Figure 16:
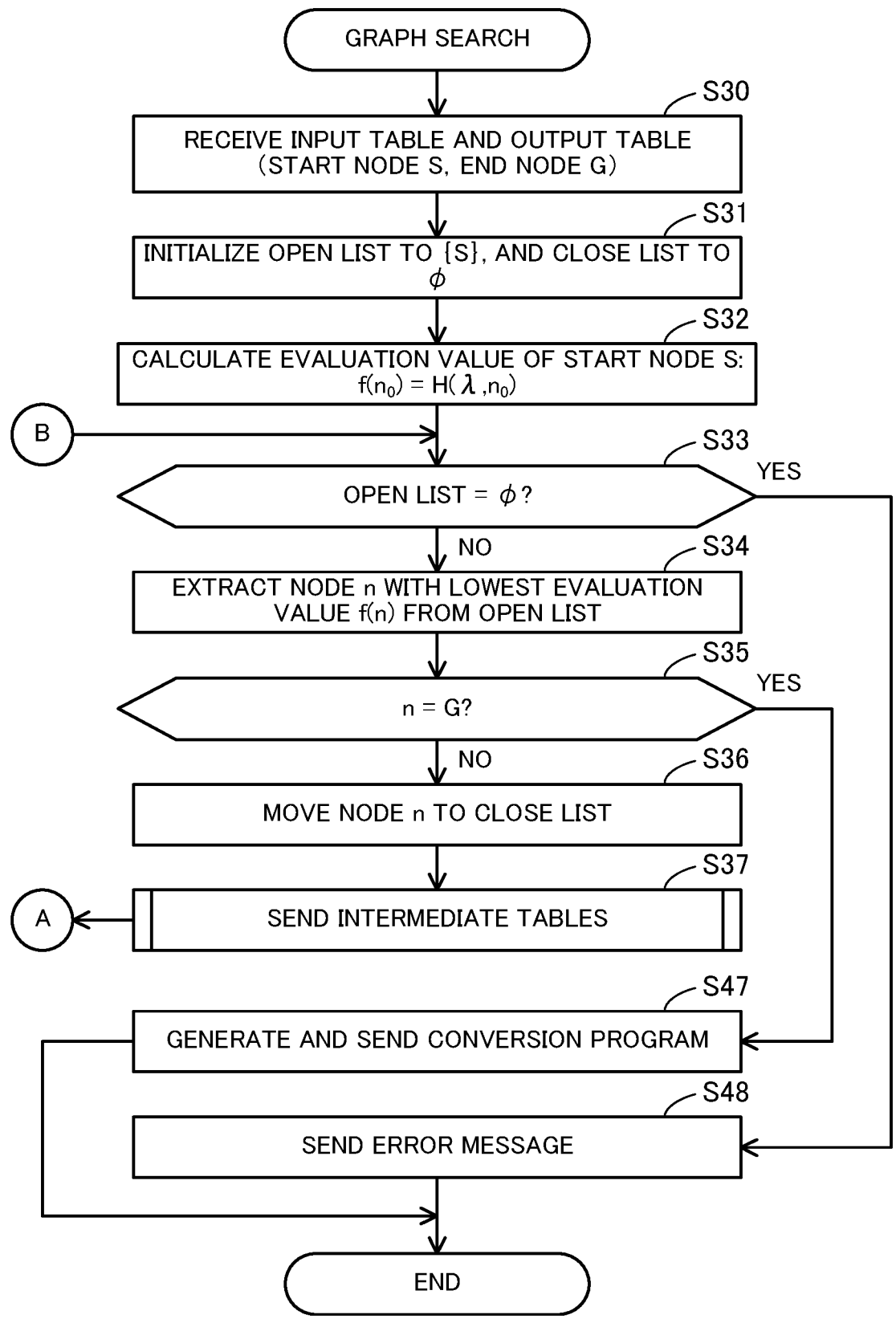
FIG. 16 is a flowchart illustrating a procedure for a graph search.

FIG. 16 is a flowchart illustrating a procedure for a graph search.

(S30) The graph search unit 225 receives an input table and an output table. A start node S and end node G respectively corresponding to the input table and output table are formed.

(S31) The graph search unit 225 initializes the OPEN list 232 to include only the start node S and also initializes the CLOSE list 233 to an empty set.

(S32) The graph search unit 225 calculates the evaluation value $f(n_0)$ of the start node S. Since the distance $g(n_0)$ of the start node S is 0, the evaluation value $f(n_0)$ of the start node S is the estimated distance $h(n_0)=H(\lambda, n_0)$. At this time, the initial weight vector $\lambda=(\lambda_0, \ldots, \lambda_{N-1})$ is used. The graph search unit 225 compares the input table and the output table with each other, calculates N estimated distances $h(n_0)$ using the N distance functions $h_0(n), \ldots, h_{N-1}(n)$ registered in the function table 231, weights the N estimated distances h(no) with the weight vector $\lambda$, and calculates the entire estimated distance $h(n_0)$. The N distance functions include a function of calculating an edit distance in character string, a function of calculating a difference or ratio of numerical values, a function of calculating a difference in time, a function of calculating a difference in the number of columns between tables, and others.

(S33) The graph search unit 225 determines whether the OPEN list 232 is empty (empty set φ or not). If the OPEN list 232 is empty, the process proceeds to step S48. Otherwise, the process proceeds to step S34.

(S34) The graph search unit 225 extracts a node with the lowest evaluation value f(n) from the OPEN list 232. In the case where two or more nodes have the lowest evaluation value f(n), any one of them is extracted. The node extracted here is represented by a node n.

(S35) The graph search unit 225 determines whether the node n is the end node G, i.e., whether the table represented by the node n matches the output table. If the node n is the end node G, the process proceeds to step S47. Otherwise, the process proceeds to step S36.

(S36) The graph search unit 225 moves the node n to the CLOSE list 233.

(S37) The graph search unit 225 determines whether to send intermediate tables. The sending of intermediate tables will be described in detail later. Then, the process proceeds to step S38.

(S47) The graph search unit 225 lists the data conversion methods on a path from the start node S to the end node G, and creates a conversion program that executes the listed data conversion methods in order. The conversion program may be created in source code form, described in a programming language, or in object code form including executable commands. Alternatively, the conversion program may describe conversion rules in a way other than programming language. The graph search unit 225 sends the conversion program to the client apparatus 100. Then, the graph search is completed.

(S48) The graph search unit 225 sends an error message indicating a failure of the graph search to the client apparatus 100. Then the graph search is completed.

Figure 17:
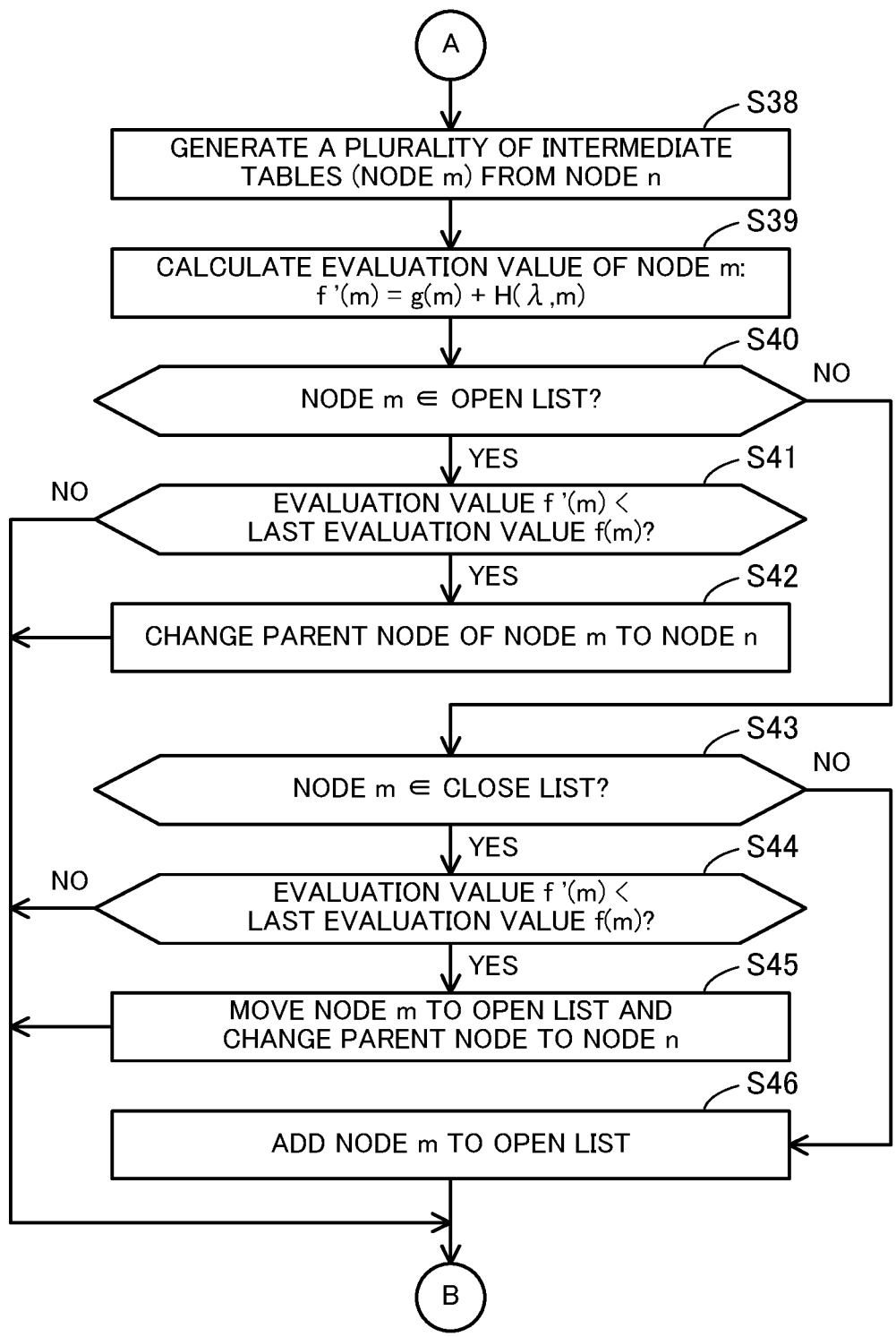
FIG. 17 is a flowchart illustrating the procedure for the graph search, continued from FIG. 16.

FIG. 17 is a flowchart illustrating the procedure for the graph search, continued from FIG. 16.

(S38) The graph search unit 225 tries executing a plurality of data conversion methods prepared in advance, individually on the table represented by the node n to thereby generate a plurality of intermediate tables. The plurality of data conversion methods include one of deleting a column from a table, one of combining an auxiliary table, one of extracting characters or a numerical value from one column, one of combining characters or numerical values of two columns, and others. A plurality of intermediate nodes representing the plurality of generated intermediate tables are formed. The following steps S39 to S46 are executed on each of the plurality of intermediate nodes. The plurality of intermediate nodes generated here are each represented by a node m.

(S39) The graph search unit 225 calculates the evaluation value f'(m) of the node m. The evaluation value f'(m) of the node m is the sum of the distance g(m) and the estimated distance h(m)=H(λ, m). The distance g(m) of the node m is greater by a cost cost(n, m) than the distance g(n) of the node n. The cost cost(n, m) may be equal to 1, and the distance g(m) may be equal to the number of hops from the start node S to the node m. In addition, the graph search unit 225 compares the intermediate table represented by the node m with the output table to calculate N estimated distances using the N distance functions registered in the function table 231, weights the N estimated distances with the weight vector λ, and calculates the entire estimated distance h(m). Here, the latest weight vector λ is used.

(S40) The graph search unit 225 determines whether the node m is included in the OPEN list 232. That is, the graph search unit 225 determines whether the intermediate table represented by the node m matches the intermediate table represented by any of the nodes included in the OPEN list 232. If the node m is included in the OPEN list 232, the process proceeds to step S41. Otherwise, the process proceeds to step S43.

(S41) The graph search unit 225 compares the evaluation value f'(m) calculated at step S39 with the last evaluation value f(m) registered in the OPEN list 232 and determines whether the evaluation value f'(m) is less than the evaluation value f(m). If f'(m)<f(m) is satisfied, the process proceeds to step S42. If f'(m)≥f(m) is satisfied, the process proceeds to step S33.

(S42) The graph search unit 225 changes the parent node of the node m to the node n. That is, a path leading to the node m is changed. Then, the process proceeds to step S33.

(S43) The graph search unit 225 determines whether the node m is included in the CLOSE list 233. That is, the graph search unit 225 determines whether the intermediate table represented by the node m matches the intermediate table represented by any one of the nodes included in the CLOSE list 233. If the node m is included in the CLOSE list 233, the process proceeds to step S44. If the node m is not included in the CLOSE list 233, the process proceeds to step S46. The latter case occurs when the intermediate table represented by the node m is an intermediate table that is generated for the first time.

(S44) The graph search unit 225 compares the evaluation value f'(m) calculated at step S39 with the last evaluation value f(m) registered in the CLOSE list 233, and determines whether the evaluation value f'(m) is less than the evaluation value f(m). If f'(m)<f(m) is satisfied, the process proceeds to step S45. If f'(m)≥f(m) is satisfied, the process proceeds to step S33.

(S45) The graph search unit 225 moves the node m from the CLOSE list 233 to the OPEN list 232. The graph search unit 225 also changes the parent node of the node m to the node n. By doing so, a path leading to the node m is changed, and the node m becomes a currently examined node (currently searched node) again. Then, the process proceeds to step S33.

(S46) The graph search unit 225 adds the node m that is a newly generated node to the OPEN list 232. Then, the process proceeds to step S33.

Figure 18:
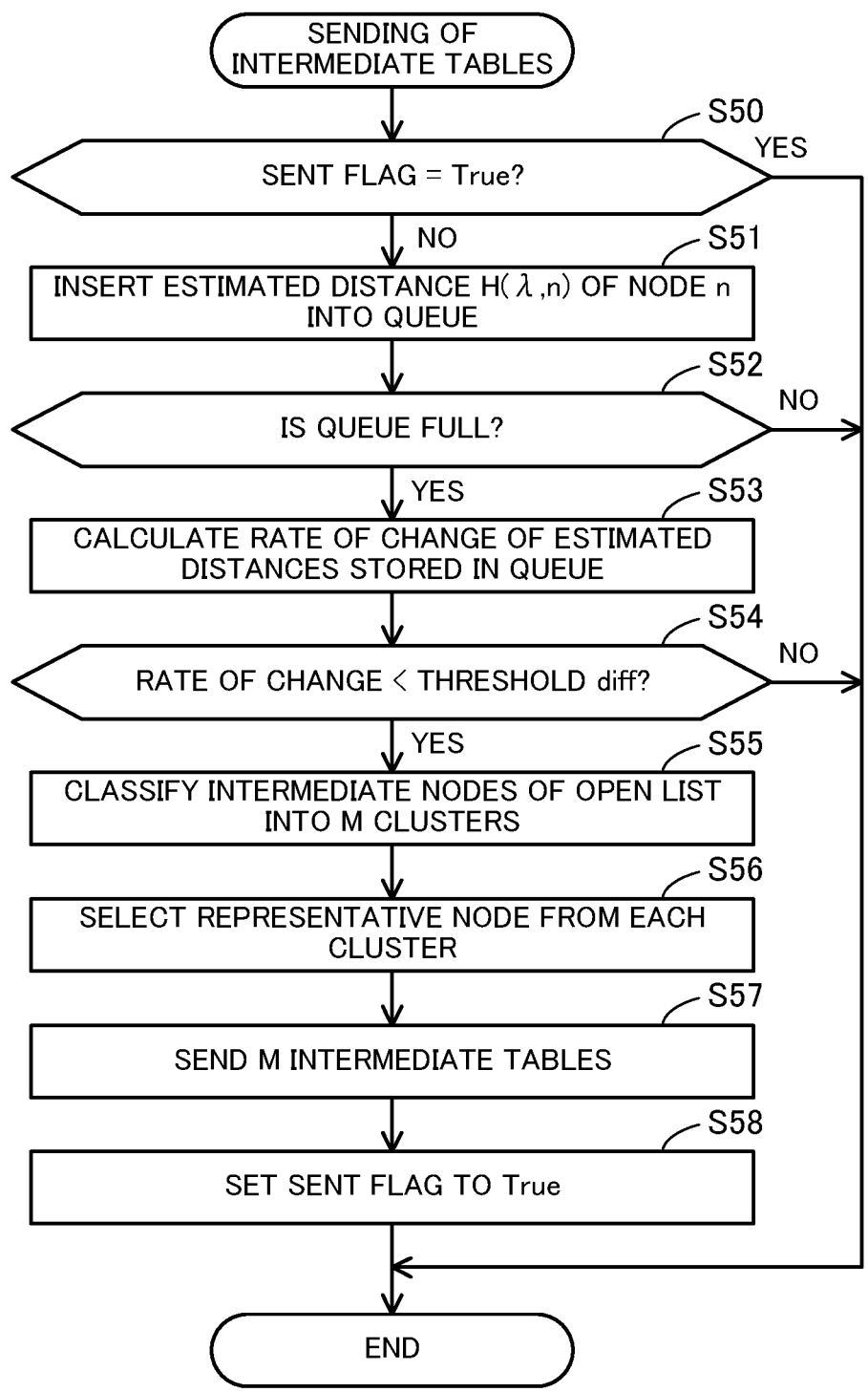
FIG. 18 is a flowchart illustrating a procedure for sending intermediate tables.

FIG. 18 is a flowchart illustrating a procedure for sending intermediate tables.

The sending of intermediate tables is executed at above-described step S37.

(S50) The graph search unit 225 determines whether a SENT flag is True. If the SENT flag is True, the sending of the intermediate tables is completed. If the SENT flag is False, then the process proceeds to step S51. In this connection, the initial value of the SENT flag is False.

(S51) The graph search unit 225 inserts the estimated distance h(n)=H(λ, n) calculated for the node n, at the end of the queue 223. The estimated distance h(n) of the node n is calculated at step S32 or S39.

(S52) The graph search unit 225 determines whether the queue 223 is full. If the queue 223 is full, the process proceeds to step S53. If not, the sending of the intermediate tables is completed.

(S53) The graph search unit 225 calculates a rate of change of the estimated distances h(n) stored in the queue 223. More specifically, the graph search unit 225 specifies the maximum value and minimum value of the estimated distances h(n) stored in the queue 223 and calculates (maximum value−minimum value)÷maximum value, as the rate of change.

(S54) The graph search unit 225 determines whether the rate of change calculated at step S53 is less than a prescribed threshold diff. If the rate of change is less than the threshold diff, the process proceeds to step S55. If the rate of change is greater than or equal to the threshold diff, the sending of intermediate tables is completed.

(S55) The graph search unit 225 classifies the intermediate nodes included in the OPEN list 232 into M clusters. For example, the graph search unit 225 divides the distribution of the estimated distances h(n) into M so that intermediate nodes with similar estimated distances h(n) belong to the same cluster, using a clustering algorithm such as the k-means clustering.

(S56) The graph search unit 225 selects one intermediate node from each of the M clusters obtained by the dividing at step S55 as a representative node. For example, the graph search unit 225 selects an intermediate node with the smallest estimated distance h(n) from each cluster.

(S57) The graph search unit 225 sends M intermediate tables represented by the M representative nodes selected at step S56 to the client apparatus 100.

(S58) The graph search unit 225 updates the SENT flag to True.

Figure 19:
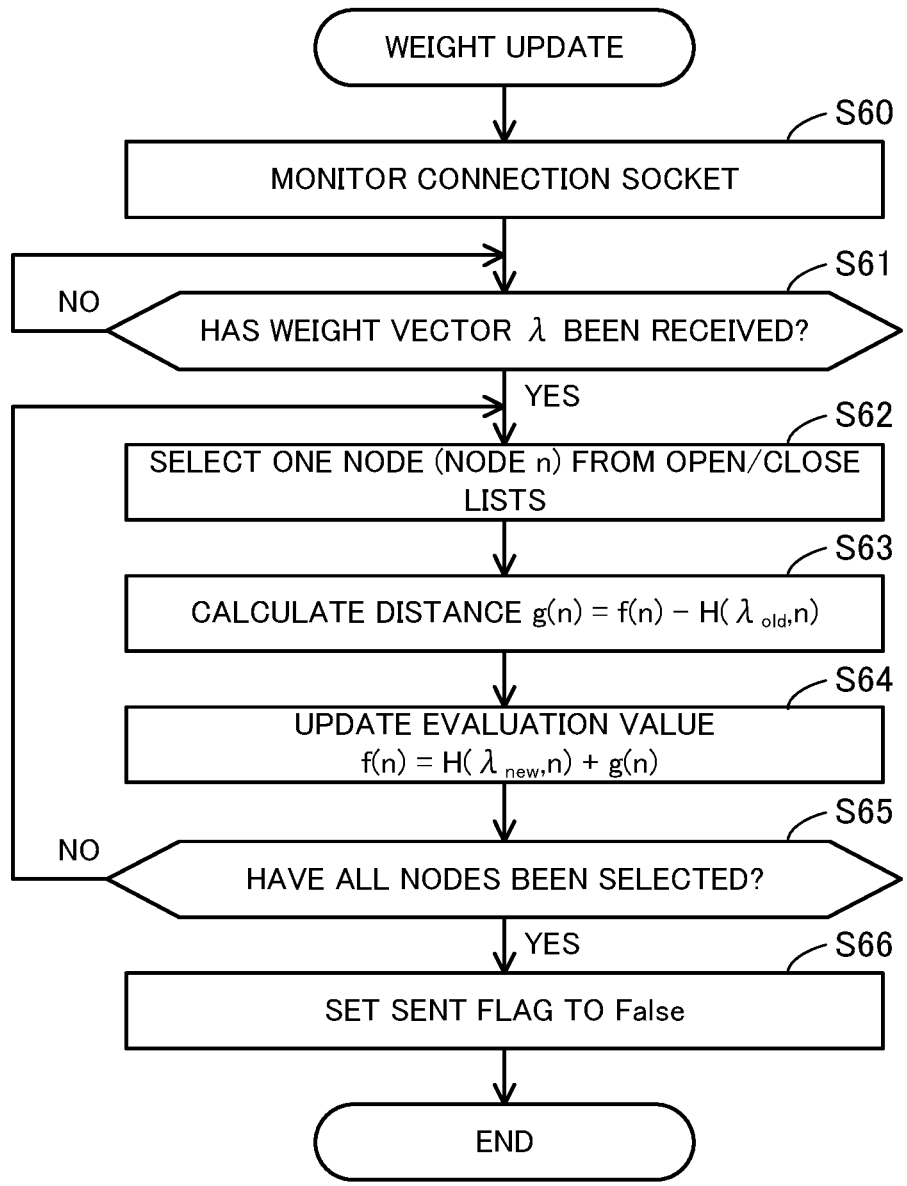
FIG. 19 is a flowchart illustrating a procedure for a weight update.

FIG. 19 is a flowchart illustrating a procedure for a weight update.

The weight update, which will be described below, is performed asynchronously with the processes of FIGS. 16 to 18 after M intermediate tables are sent at above step S57. That is, the graph search unit 225 keeps performing the graph search without waiting for a response from the client apparatus 100.

(S60) The weight update unit 226 monitors a connection socket generated in response to a connection request from the client apparatus 100 and waits for data arrival from the client apparatus 100.

(S61) The weight update unit 226 determines whether the weight vector $\lambda$ has been received. If the weight vector $\lambda$ has been received, the process proceeds to step S62. Otherwise, the weight update unit 226 stays at step S61 to wait for the weight vector $\lambda$.

(S62) The weight update unit 226 selects one node from a set of nodes included in the OPEN list 232 and CLOSE list 233. The set of nodes used for the selection includes the start node S and all currently existing intermediate nodes including both currently examined nodes (currently searched node) and already examined nodes (already searched nodes). The reason the following steps S63 and S64 are executed on the nodes included in the CLOSE list 233 is because the last evaluation value is referenced at step S44 and if a prescribed condition is met, the corresponding node is moved from the CLOSE list 233 to the OPEN list 232. The node selected here is represented by a node n.

(S63) The weight update unit 226 compares the table represented by the node n with the output table represented by the end node G, and calculates the entire estimated distance h(n)=H($\lambda_{old}$, n) using the N distance functions $h_i(n)$ and pre-update weight vector $\lambda_{old}$. However, in the case where with respect to the node n, the estimated distances of the N distance functions $h_i(n)$ calculated in the past or the entire estimated distance h(n) is already stored, the stored estimated distances may be used. Then, the weight update unit 226 calculates the distance g(n) of the node n by subtracting the above estimated distance h(n) from the current evaluation value f(n) of the node n. However, in the case where the distance g(n) calculated in the past is already stored for the node n, the distance g(n) does not need to be calculated again.

(S64) The weight update unit 226 calculates the entire estimated distance h(n)=H($\lambda_{new}$, n) using the estimated distances of the N distance functions $h_i(n)$ calculated at step S63 and the updated weight vector $\lambda_{new}$ received at step S61. Then, the weight update unit 226 calculates the updated evaluation value f(n) by adding the distance g(n) to the updated estimated distance h(n).

(S65) The weight update unit 226 determines whether all nodes included in the OPEN list 232 and CLOSE list 233 have been selected. If all the nodes have been selected, the process proceeds to step S66. If any node has not been selected, the process proceeds to step S62.

(S66) The weight update unit 226 updates the SENT flag to False.

Figure 20:
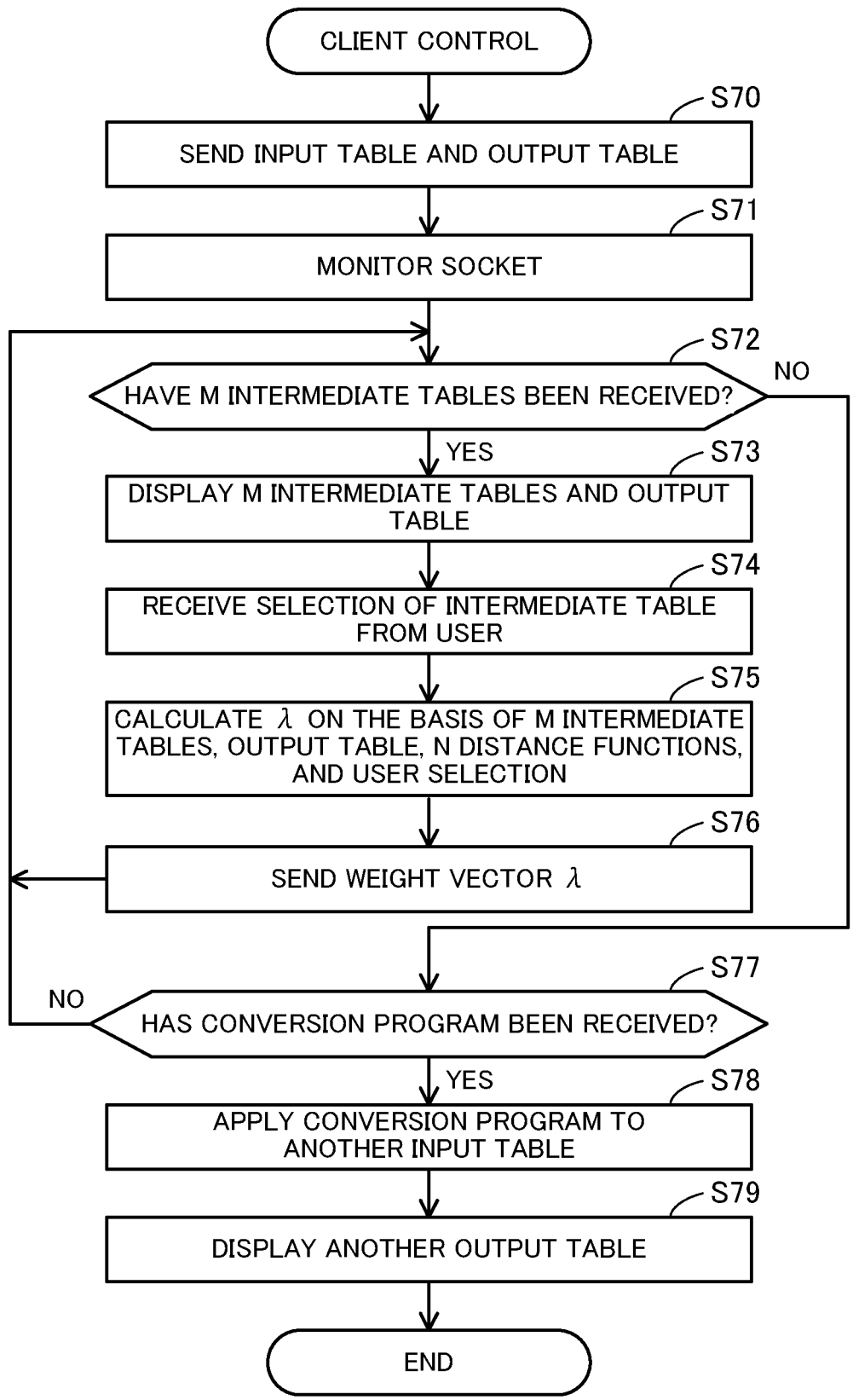
FIG. 20 is a flowchart illustrating a procedure for client control.

FIG. 20 is a flowchart illustrating a procedure for client control.

(S70) The search request unit 124 receives a data conversion request specifying the input table and output table of a conversion example and another input table from a user. The search request unit 124 connects to the server apparatus 200 and sends the input table and output table thereto.

(S71) The intermediate table selection unit 125 and conversion program execution unit 127 monitor a socket for connection to the server apparatus 200 and waits for arrival of data from the server apparatus 200.

(S72) The intermediate table selection unit 125 determines whether M intermediate tables have been received. If the M intermediate tables have been received, the process proceeds to step S73. Otherwise, the process proceeds to step S77. In this connection, there are times when the sending of the M intermediate tables from the server apparatus 200 to the client apparatus 100 is not performed even once, is performed only once, or is performed twice or more.

(S73) The intermediate table selection unit 125 generates a selection screen 80 including the M intermediate tables received from the server apparatus 200 and the output table held in own apparatus. The intermediate table selection unit 125 displays the generated selection screen 80 on the display device 111.

(S74) The intermediate table selection unit 125 receives a user selection operation made on the selection screen 80. By the user selection operation, one of the M intermediate tables is selected.

(S75) The weight calculation unit 126 calculates a new weight vector $\lambda$ on the basis of the M intermediate tables, output table, the N distance functions $h_i(n)$ held in own apparatus, and the user selection result received at step S74. More specifically, the weight calculation unit 126 compares each of the M intermediate tables with the output table and calculates M×N estimated distances using the N distance functions $h_i(n)$. The weight calculation unit 126 adjusts the weight vector $\lambda$ so that one estimated distance h(n) for one intermediate table selected by the user becomes small and the M−1 estimated distances h(n) for the M−1 intermediate tables unselected by the user become large.

(S76) The weight calculation unit 126 sends the weight vector $\lambda$ calculated at step S75 to the server apparatus 200. Then, the process proceeds to step S72.

(S77) The conversion program execution unit 127 determines whether the conversion program has been received as a response to the conversion example. If the conversion program has been received, the process proceeds to step S78. Otherwise, the process proceeds to step S72.

(S78) The conversion program execution unit 127 executes the conversion program on another input table (a table including an input dataset different from the conversion example) specified by the user. Thereby, another output table corresponding to the other input table is generated.

(S79) The conversion program execution unit 127 displays the other output table generated at step S78 on the display device 111. In this connection, the conversion program execution unit 127 may store the other output table in a storage device such as the HDD 103, may output it to another output device, or may send it to another information processing apparatus.

With the information processing system of the second embodiment, a conversion program is created based on a small number of data conversion examples using programming by example, and another dataset is converted by the conversion program. Therefore, the user does not need to explicitly write the conversion program in a programming language and thus the load of the data conversion is reduced.

In addition, a combination of data conversion methods that realize a data conversion example is found by a graph search. In the graph search, using the A* algorithm, a distance between each intermediate node and an end node is estimated using a distance function, and the search progresses preferentially in a direction that efficiently approaches the end node. Therefore, it is possible to efficiently search for the combination of data conversion methods that realize the data conversion example. In addition, in calculating an estimated distance, differences between an intermediate table and the output dataset are evaluated in terms of a plurality of data types and the weighted sum of estimated distances for respective data types is calculated as the entire estimated distance. Therefore, a combination of different types of data conversion methods is correctly evaluated.

In addition, some intermediate tables are presented to a user in the course of the graph search, an intermediate table closest to the output table is selected by the user, and a weight vector for the distance function is updated based on the user selection. Therefore, the distance function is adjusted so as to streamline the graph search according to the features of the datasets used in the conversion. In addition, the update of the weight vector and the graph search are performed asynchronously, and therefore the graph search progresses even during a time period from the presentation of the intermediate tables to the obtaining of a new weight vector. This prevents the update of the weight vector from interfering the graph search. In addition, instead of causing the user to specify the weight vector itself, the user is caused to select a preferable intermediate table, and then a new weight vector is calculated based on the user selection. This allows user's intuitive operation and reduces load on the user.

According to one aspect, a search for a data conversion path is streamlined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   obtaining an input dataset and an output dataset;
   beginning a search process that includes generating a plurality of first intermediate datasets from the input dataset with different data conversion methods and generating a second intermediate dataset from a first intermediate dataset obtained by filtering the plurality of first intermediate datasets with a filtering method, the search process being a process of searching for a data conversion path of converting the input dataset via part of a set of intermediate datasets including the plurality of first intermediate datasets and the second intermediate dataset to the output dataset;
   detecting that a quantity of the set generated in a course of the search process or a number of executions of the different data conversion methods exceeds a threshold but the output dataset has not been reached;
   outputting, in response to the detecting, two or more third intermediate datasets included in the set generated in the course of the search process and receiving selection information indicating a third intermediate dataset selected from the two or more third intermediate datasets; and
   controlling the filtering method, wherein the controlling includes converting at least one of the two or more third intermediate datasets based on the selection information into a fourth intermediate dataset by one of the different data conversion methods.

2. The non-transitory computer-readable storage medium according to claim 1, wherein:
   the search process further includes calculating an evaluation value of each of the plurality of first intermediate datasets using an evaluation function and determining, based on the evaluation value, the first intermediate dataset that is obtained by the filtering; and
   the controlling includes updating the evaluation function, based on the selection information.

3. The non-transitory computer-readable storage medium according to claim 2, wherein:
   the evaluation function weights a plurality of estimated distances calculated with a plurality of distance functions, using weight values respectively corresponding to the plurality of distance functions, respectively, and calculates the evaluation value; and
   the updating of the evaluation function includes updating the weight values, based on the selection information.

4. The non-transitory computer-readable storage medium according to claim 2, wherein
   the updating of the evaluation function includes updating the evaluation function so that the third intermediate dataset selected has higher evaluation than third intermediate datasets unselected from the two or more third intermediate datasets.

5. The non-transitory computer-readable storage medium according to claim 1, wherein
   the outputting of the two or more third intermediate datasets includes classifying, into two or more clusters, end intermediate datasets located at respective ends of candidates for the data conversion path in the course of the search process and extracting at least one third intermediate dataset from each of the two or more clusters.

6. The non-transitory computer-readable storage medium according to claim 1, wherein:
the receiving of the selection information is executed without interrupting the search process; and
the filtering method is changed in the course of the search process.

7. The non-transitory computer-readable storage medium according to claim 1, wherein
the receiving of the selection information includes displaying the two or more third intermediate datasets on a display device and causing a user to select the third intermediate dataset from the two or more third intermediate datasets.

8. A search control method comprising:
obtaining, by a processor, an input dataset and an output dataset;
beginning, by the processor, a search process that includes generating a plurality of first intermediate datasets from the input dataset with different data conversion methods and generating a second intermediate dataset from a first intermediate dataset obtained by filtering the plurality of first intermediate datasets with a filtering method, the search process being a process of searching for a data conversion path of converting the input dataset via part of a set of intermediate datasets including the plurality of first intermediate datasets and the second intermediate dataset to the output dataset;
detecting, by the processor, that a quantity of the set generated in a course of the search process or a number of executions of the different data conversion methods exceeds a threshold but the output dataset has not been reached;
outputting, by the processor, in response to the detecting, two or more third intermediate datasets included in the set generated in the course of the search process and receiving selection information indicating a third intermediate dataset selected from the two or more third intermediate datasets; and
controlling, by the processor, the filtering method, wherein the controlling includes converting at least one of the two or more third intermediate datasets based on the selection information into a fourth intermediate dataset by one of the different data conversion methods.

9. A search control apparatus comprising:
a memory that stores therein an input dataset and an output dataset; and
a processor that performs a process including
beginning a search process that includes generating a plurality of first intermediate datasets from the input dataset with different data conversion methods and generating a second intermediate dataset from a first intermediate dataset obtained by filtering the plurality of first intermediate datasets with a filtering method, the search process being a process of searching for a data conversion path of converting the input dataset via part of a set of intermediate datasets including the plurality of first intermediate datasets and the second intermediate dataset to the output dataset,
detecting that a quantity of the set generated in a course of the search process or a number of executions of the different data conversion methods exceeds a threshold but the output dataset has not been reached,
outputting, in response to the detecting, two or more third intermediate datasets included in the set generated in the course of the search process and receiving selection information indicating a third intermediate dataset selected from the two or more third intermediate datasets, and
controlling the filtering method, wherein the controlling includes converting at least one of the two or more third intermediate datasets based on the selection information into a fourth intermediate dataset by one of the different data conversion methods.

* * * * *